(12) United States Patent
Verdú et al.

(10) Patent No.: US 12,392,662 B2
(45) Date of Patent: Aug. 19, 2025

(54) PERCEPTUAL-REALISTIC COLORED SPARKLE EVALUATION AND MEASUREMENT SYSTEM FOR IMAGE-BASED MATCHING OF COLOR AND APPEARANCE OF COATINGS CONTAINING EFFECT PIGMENTS

(71) Applicant: AXALTA COATING SYSTEMS IP CO., LLC, Wilmington, DE (US)

(72) Inventors: Francisco Miguel Martínez Verdú, Upper Darby, PA (US); Larry E. Steenhoek, Ellicott City, MD (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 371 days.

(21) Appl. No.: 18/182,592

(22) Filed: Mar. 13, 2023

(65) Prior Publication Data

US 2024/0310213 A1 Sep. 19, 2024

(51) Int. Cl.
*G01J 3/50* (2006.01)
*G01J 3/46* (2006.01)
*G06T 7/90* (2017.01)

(52) U.S. Cl.
CPC .............. *G01J 3/504* (2013.01); *G01J 3/463* (2013.01); *G06T 7/90* (2017.01); *G06T 2207/10024* (2013.01); *G06T 2207/30156* (2013.01)

(58) Field of Classification Search
CPC ... G06T 7/90; G06T 7/001; G06T 7/11; G06T 2207/10024; G06T 2207/30156;
(Continued)

(56) References Cited

U.S. PATENT DOCUMENTS 7,679,756 B2 3/2010 Sperling et al.
8,065,314 B2 11/2011 Prakash et al.
(Continued)

FOREIGN PATENT DOCUMENTS

EP 1695293 A1 8/2006
EP 3500830 A1 6/2019
(Continued)

OTHER PUBLICATIONS

Kim Min H et al: "Modeling human color perception under extended luminance levels" dated Jul. 27, 2009, pp. 1-9, vol. No. 28.
(Continued)

*Primary Examiner* — Christopher Wait
(74) *Attorney, Agent, or Firm* — Ingrassia Fisher & Lorenz, LLP

(57) ABSTRACT

A computing system and associated methodology of evaluating and matching colored sparkle appearance of coatings containing at least one effect pigment type are disclosed. The methodology processes a digital image of a coating sample obtain pixel-specific sparkle point data and pixel-specific background data, both of which are formatted in accordance with an advanced color appearance model that corresponds to human color perception. A colored sparkle visual scaling value is calculated from the pixel-specific data, wherein the visual scaling value indicates colored sparkle characteristics of the coating sample. The visual scaling value of the coating sample is compared against the visual scaling value of a previously-characterized candidate coating specimen. The results of the comparison are used to determine how well the candidate coating specimen matches (in colored sparkle characteristics) the coating sample.

24 Claims, 9 Drawing Sheets

(58) Field of Classification Search
CPC . G06T 2207/20021; G06T 2207/20081; G06T 2207/20084; G01J 3/463; G01J 3/504; G06K 9/6201; G06K 9/6247; G06K 9/6282; G06N 3/0481; G06N 3/08; G06N 20/00; G06V 10/443; G06V 10/56
See application file for complete search history.

(56) References Cited

U.S. PATENT DOCUMENTS

| | | |
|---|---|---|
| 8,909,574 B2 | 12/2014 | Mohammadi et al. |
| 9,607,403 B2 | 3/2017 | Beymore et al. |
| 9,880,098 B2 | 1/2018 | Prakash et al. |
| 9,905,027 B2 | 2/2018 | Beymore et al. |
| 10,613,727 B2 | 4/2020 | Beymore et al. |
| 10,928,327 B2 | 2/2021 | Steenhoek et al. |
| 10,950,008 B2 | 3/2021 | Beymore et al. |
| 11,062,479 B2 | 7/2021 | Steenhoek et al. |
| 2007/0250273 A1 | 10/2007 | De Haas et al. |
| 2011/0246087 A1 | 10/2011 | Prakash et al. |
| 2012/0236309 A1 | 9/2012 | Krause et al. |
| 2014/0242271 A1 | 8/2014 | Prakash et al. |
| 2016/0321546 A1* | 11/2016 | Delespierre ............. G01J 3/463 |
| 2021/0201513 A1 | 7/2021 | Steenhoek et al. |

FOREIGN PATENT DOCUMENTS

| | | |
|---|---|---|
| WO | 2017143278 A1 | 8/2017 |
| WO | 2020200982 A1 | 10/2020 |
| WO | 2021013615 A1 | 1/2021 |
| WO | 2021055745 A1 | 3/2021 |
| WO | 2021083982 A1 | 5/2021 |

OTHER PUBLICATIONS

Kirchner E et al: "Observation of visual texture of metallic and pearlescent materials" dated Aug. 1, 2007, pp. 256-266, vol. No. 32.

Zhongning Huang et al: "Camera-based model to predict the total difference between effect coatings under directional illumination" dated Sep. 10, 2011, pp. 093301-93305, vol. No. 9.

Ferrero A et al: "The measurement of sparkle" dated Mar. 24, 2015, pp. 317-323, vol. No. 52.

N. Dekker et al: "Total appearance differences for metallic and pearlescent materials: Contributions from color and texture"dated Feb. 24, 2010, pp. 4-14, vol. No. 36.

ASTM E 284-17, "Standard Terminology of Appearance", ASTM International, West Conshohocken, PA. 2017.

Dauser T. "Definition of Tolerances and Evaluation of the Difference in the Sparkling and Graininess of Effect Paints" Volkswagen (2010), pp. 1-6, vol. VW50194, No. 2010-09.

Ferrero A., et al. "An insight into the present capabilities of national metrology institutes for measuring sparkle", Metrologia, Nov. 2020 pp. 2-19, vol. 57, IOP Publishing.

Ferrero A et al. "Preliminary measurement scales for sparkle and graininess" Research Article, Mar. 2021 pp. 1-12. vol. 29.

Kirchner Eric et al. "Visibility of Sparkle in Metallic Paints", Research Article, Nov. 2014 pp. 1-7, vol. 32.

Kitaguchi S. "Modeling Texture Appearance of Gonioapparent Objects" University of Leeds PHD thesis, Mar. 2008 pp. 3-274.

Wei Ting Shou et al. "A Comprehensive Model of Colour Appearance for Related and Unrelated Colours of Varying Size Viewed Under Mesopic to Photopic Conditions" Color Research Application, Feb. 2014 pp. 293-304, vol. 42.

Yang Jie et al. "Predicting visual similarity between colour palettes", Research Article, Jul. 2019 pp. 1-8, vol. 22492.

Zhongning H., et al. "Camera-based model to predict the total difference between effect coatings under directional illumination". Chinese Optics Letters, Sep. 2011 pp. 1-5, vol. 9.

* cited by examiner

PERCEPTUAL-REALISTIC COLORED SPARKLE EVALUATION AND MEASUREMENT SYSTEM FOR IMAGE-BASED MATCHING OF COLOR AND APPEARANCE OF COATINGS CONTAINING EFFECT PIGMENTS

TECHNICAL FIELD

Embodiments of the subject matter described herein relate generally to coatings technology. More particularly, embodiments of the subject matter relate to systems and methods for evaluating and matching colored sparkle appearance of a sample coating to one or more known coating specimens.

BACKGROUND

Visualization and selection of coatings having a desired color and appearance play an important role in many applications. For example, paint suppliers must provide thousands of coatings to cover the range of global OEM manufacturers' coatings for all current and recent model vehicles. Providing this large number of different coatings as factory package products adds complexity to paint manufacture and increases inventory costs. Consequently, paint suppliers provide a mixing machine system including typically 50 to 100 components (e.g., single pigment tints, binders, solvents, additives) with coating formulas for the components that match the range of coatings of vehicles. The mixing machine may reside at a repair facility (i.e., body shop) or a paint distributor. The system allows a user to obtain a coating having the desired color and appearance by dispensing the components in amounts corresponding to a particular coating formula. The coating formulas are typically maintained in a database and are distributed to customers via computer software by download or direct connection to internet databases. Each of the coating formulas typically relate to one or more alternate coating formulas to account for variations in coatings due to variations in vehicle production.

Identification of the coating formula most similar to a target coating sample is complicated by this variation. For example, a particular coating might appear on three vehicle models, produced in two assembly plants with various application equipment, using paint from two OEM paint suppliers, and over a lifetime of five model years. Effect coatings further complicate coating matching due to spatially nonuniform color variation in visual texture or appearance, such as colored sparkle, always present under directional illumination, both at indoors (lighting booths, etc.) and outdoors (sunlight, etc.). These sources of variation result in significant coating variation over the population of vehicles with that particular coating. The alternate coating formulas provided by the paint supplier are matched to subsets of the color population so that a close match (based on a combination of color and visual texture matches at different measurement geometries) is available for any vehicle that needs repair.

Identifying the effect coating formula most similar to an effect target coating sample for a repair is typically accomplished through the use of a multi-angle spectrophotometer or a fan deck. Multi-angle or multi-gonio spectrophotometers and image capture systems measure one or more color and appearance attributes of the target coating to be repaired. This color and appearance data is then compared with the corresponding data from potential candidate formulas contained in a database. The candidate formula whose color and appearance attributes best match those of the target coating to be repaired is then selected as the coating formula most similar to the target coating.

Alternatively, fan decks include a plurality of sample coating layers on pages or patches within the fan deck. Each of the alternate coating formulas can be represented by a color chip in the fan deck, which enables the user to select the best matching formula by visual comparison to the vehicle (the sample coating layers of the fan deck are visually compared to the target coating sample to be matched) under different measurement geometries (combination of illumination and viewing angles). The formula associated with the sample coating layer best matching the color and appearance attributes of the target coating to be matched is then selected as the coating formula most similar to the target coating sample. However, fan decks are cumbersome to use and difficult to maintain due to the vast number of sample coating layers necessary to account for all coatings on vehicles on the road today.

Optical measurement of color and colored sparkle is important for achieving high quality appearance matching of two effect coatings. Colored sparkle is a visual effect caused by direct reflection from disoriented pigment flakes (behaving as total or partial micro-mirrors) contained in a coating composition (e.g., aluminum or pearlescent flakes). ASTM International defines sparkle as: "the aspect of the appearance of a material that seems to emit or reveal tiny bright points of light that are strikingly brighter than their immediate surround and are made more apparent when a minimum of one of the contributors (observer, specimen, light source) is moved" (ASTM E284-17—Standard Terminology of Appearance). Colored sparkle effects include a random and dynamic pattern (visual texture) under different directional illumination conditions. Sparkle points can be visible (high-contrast on a darker colored background) at specific combinations of lamp/lighting position, sample position, and observer position, even with small displacements and/or inclinations of them, isolated or combined.

As such, it is desirable to provide a system and a method for matching color and colored sparkle appearance of coatings containing at least one effect pigment type. In addition, other desirable features and characteristics will become apparent from the subsequent summary and detailed description, and the appended claims, taken in conjunction with the accompanying drawings and this background.

BRIEF SUMMARY

This application discloses a computer-implemented method of evaluating and matching colored sparkle appearance of coatings containing at least one effect pigment type. Exemplary embodiments of the method involve: receiving a digital image of a coating sample to be colored sparkle matched, the digital image captured by a digital image capture system, and the digital image represented by captured color image data formatted in accordance with a first color model that is native to the digital image capture system; converting the captured color image data into pixel-specific sparkle point data and pixel-specific background data, wherein the pixel-specific sparkle point data and the pixel-specific background data are both formatted in accordance with an advanced color appearance model that corresponds to human color perception; calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched; retrieving a second colored sparkle visual scaling value for a candidate coating specimen, wherein the second colored sparkle visual scaling value indicates colored sparkle characteristics of the candidate coating specimen; comparing the first colored sparkle visual scaling value against the second colored sparkle visual scaling value; and determining how well the candidate coating specimen matches the coating sample to be colored sparkle matched, based on results of the comparing step.

Also disclosed is a computing system operable to match color and appearance of coatings containing at least one effect pigment type. Exemplary embodiments of the computing system include: at least one processor; and at least one non-transitory machine-readable storage medium that stores instructions executable by the at least one processor. The instructions are configurable to cause the at least one processor to perform a method that includes the steps of: receiving a digital image of a coating sample to be colored sparkle matched, the digital image captured by a digital image capture system, and the digital image represented by captured color image data formatted in accordance with a first color model that is native to the digital image capture system; converting the captured color image data into pixel-specific sparkle point data and pixel-specific background data, wherein the pixel-specific sparkle point data and the pixel-specific background data are both formatted in accordance with an advanced color appearance model that corresponds to human color perception; calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched; retrieving a second colored sparkle visual scaling value for a candidate coating specimen, wherein the second colored sparkle visual scaling value indicates colored sparkle characteristics of the candidate coating specimen; comparing the first colored sparkle visual scaling value against the second colored sparkle visual scaling value; and determining how well the candidate coating specimen matches the coating sample to be colored sparkle matched, based on results of the comparing step.

Also disclosed is at least one non-transitory machine-readable storage medium that stores instructions executable by at least one processor, the instructions configurable to cause the at least one processor to perform a method of matching colored sparkle appearance of coatings containing at least one effect pigment type. Exemplary embodiments of this method include the following steps: receiving a digital image of a coating sample to be colored sparkle matched, the digital image captured by a digital image capture system, and the digital image represented by captured color image data formatted in accordance with a first color model that is native to the digital image capture system; converting the captured color image data into pixel-specific sparkle point data and pixel-specific background data, wherein the pixel-specific sparkle point data and the pixel-specific background data are both formatted in accordance with an advanced color appearance model that corresponds to human color perception; calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched; retrieving a second colored sparkle visual scaling value for a candidate coating specimen, wherein the second colored sparkle visual scaling value indicates colored sparkle characteristics of the candidate coating specimen; comparing the first colored sparkle visual scaling value against the second colored sparkle visual scaling value; and determining how well the candidate coating specimen matches the coating sample to be colored sparkle matched, based on results of the comparing step.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
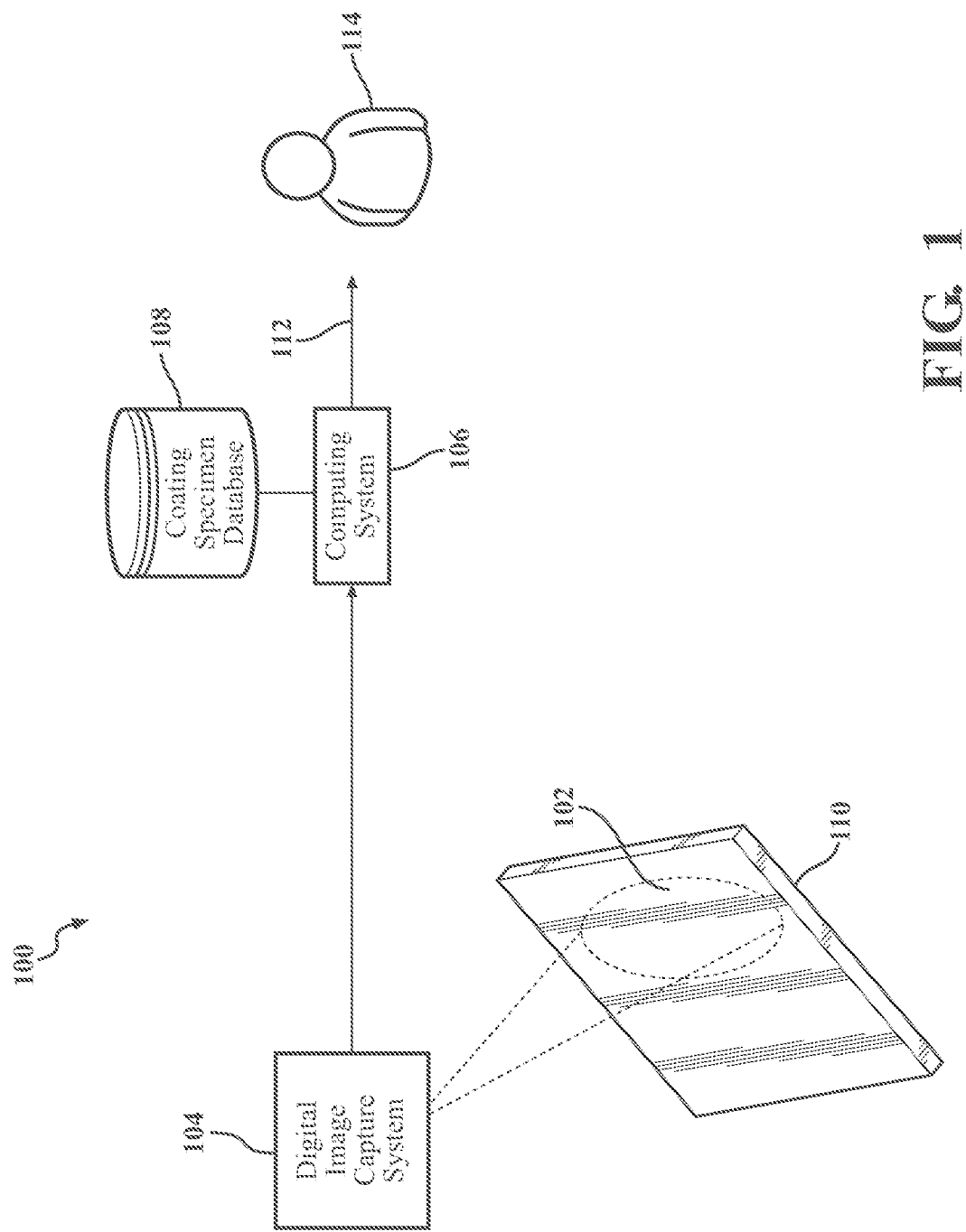
FIG. 1 is a simplified block diagram representation of a system for evaluating and matching color and appearance of coatings, in accordance with exemplary embodiments of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software, or the like, various elements of the systems and devices described herein are essentially the code segments or instructions that cause one or more processor devices to perform the various tasks. In certain embodiments, the program or code segments are stored in at least one tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

As used herein, the term "pigment" or "pigments" refers to a colorant or colorants that produce color or colors. A pigment can be from natural or synthetic sources and can be made of organic and/or inorganic constituents. Pigments can also include metallic particles or flakes with specific or mixed shapes and dimensions. A pigment is usually not soluble in a coating composition.

The term "effect pigment" or "effect pigments" refers to pigments that produce special spatially nonuniform effects in a coating. i.e., goniochromatism and visual texture (sparkle and graininess). Examples of effect pigments include, but are not limited to, light scattering pigments, light interference pigments, and light reflecting pigments. Metallic flakes, such as aluminum flakes, and pearlescent pigments, such as natural or synthetic mica-based pigments, Xirallic pigments, and colored aluminum flakes, are examples of effect pigments.

The term "appearance" can include: (1) the aspect of visual experience by which a coating is viewed or recognized; and (2) perception in which the spectral and geometric aspects of a coating are integrated with its illuminating and viewing environment. In general, appearance includes texture, coarseness or graininess, sparkle, or other visual effects of a coating, especially when viewed from varying viewing angles and/or with varying illumination conditions. Appearance characteristics or appearance data can include, but not limited to, descriptions or measurement data on texture, metallic effect, pearlescent effect, gloss, distinctness of image, flake appearances and sizes such as texture, coarseness or graininess, sparkle, glint and glitter as well as the enhancement of depth perception in the coatings imparted by the flakes, especially produced by metallic and pearlescent flakes. Appearance characteristics can be obtained by visual inspection or by using an appearance measurement device.

The term "color data" or "color characteristics" or "color model properties" of a coating can comprise measured color data including, without limitation: spectral reflectance values; X, Y, Z values; L*, a*, b* values; L*, C*, $h_{ab}$ values; or a combination thereof. Color data can further comprise a color code of a vehicle, a color name or description, or a combination thereof. Color data may also comprise visual aspects of color of the coating, chroma, hue, lightness or darkness. Color data can be obtained by visual inspection, or by using a color measurement device such as a colorimeter, a spectrophotometer, or a goniospectrophotometer. In particular, spectrophotometers obtain color data by determining the wavelength spectrum of light reflected by a coating layer. Color data can also comprise: descriptive data, such as a name of a color, a color code of a vehicle; a binary, textural or encrypted data file containing descriptive data for one or more colors; a measurement data file, such as those generated by a color measuring device; or an export/import data file generated by a computing device or a color measuring device. Color data can also be generated by an appearance measuring device or a color-appearance dual measuring device.

The term "coating" or "coating composition" can include any coating compositions known to those skilled in the art and can include a two-pack coating composition, also known as "2K coating composition"; a one-pack or 1K coating composition; a coating composition having a crosslinkable component and a crosslinking component; a radiation curable coating composition, such as a UV curable coating composition or an e-beam curable coating composition; a mono-cure coating composition; a dual-cure coating composition; a lacquer coating composition; a waterborne coating composition or aqueous coating composition; a solvent borne coating composition; or any other coating compositions known to those skilled in the art. The coating composition can be formulated as a primer, a basecoat, a midcoat, a clearcoat, or a color coat composition by incorporating desired pigments or effect pigments. The coating composition can also include a clearcoat composition.

The term "formula," "matching formula," or "matching formulation" for a coating composition refers to a collection of information or instruction, based upon that, the coating composition can be prepared. In one example, a matching formula includes a list of names and quantities of solid pigments, effect pigments, and other components of a coating composition. In another example, a matching formula includes instructions on how to mix multiple components of a coating composition.

The subject matter described here relates to a system and related operating methodologies for analyzing the visual appearance of coatings, such as coatings that exhibit colored sparkle characteristics. The techniques and technologies described here can be utilized to compare coatings containing at least one effect pigment type that causes colored sparkle. As a different example, if two colored sparkle coating specimens exhibit similar sparkle density, similar high color contrast between sparkle points and non-sparkle points darker colored background, and similar colored sparkle gamuts, then the specimens can be described as having similar or matching colored sparkle appearance since its coating formulas have similar effect pigment types, with similar concentrations. In certain embodiments, a colored sparkle model emulates human visual perception when two colored sparkle samples are compared under different lighting and viewing conditions. High dynamic range (HDR) color images are used to accurately encode the rich chromatic variety of colored sparkle patterns without losing valuable image information. Color differences (determined using an advanced color appearance model or human color perception model) between sparkle points and background points, at a representative refinish field condition, are computed to derive sparkle texture and sparkle strength quantities for purposes of colored sparkle visual scaling or evaluation. When two coating specimens are compared, a multiple screening process is applied to predict the visual matching decision (whether the colored sparkle appearance of the two specimens poorly match or closely match). The matching decision is preferably based on calculated colored sparkle texture and sparkle strength differences, visual tolerance, and colored sparkle gamut comparison. In accordance with certain embodiments, the results of the comparison, sequentially composed by three queries (colored sparkle scaling value difference; spatial pattern or macrotexture difference; colored sparkle gamut or close-view texture difference), are used to determine how well the candidate coating specimen matches (in colored sparkle characteristics) the coating sample.

Colored sparkle can be measured and visually scaled using a computer-implemented system that is configured and operated in the manner described in more detail below. Sparkle (which may be achromatic or chromatic) is visually perceived as a number of high-contrast sparkle points (points where light is reflected toward the observer coming from disoriented flakes, but behaving as total or partial micro-mirrors) positioned over a darker background. The primary visual attributes of achromatic sparkle are: density of sparkle points; and high-contrast average. The primary visual attributes of chromatic sparkle are: density of sparkle points; high color contrast average; and the color gamut palette of the individual sparkle points (bluish, reddish, greenish, etc.). As an example, two colored sparkle coating specimens may be visually characterized by a similar sparkle density, a similar high color contrast appearance between sparkle points and darker colored background, but different colored sparkle gamuts (e.g., primarily greenish sparkle points for one coating specimen, and a combination of greenish and reddish sparkle points for the other coating specimen). For this example, the different colored sparkle gamuts make the two coating specimens appear visually dissimilar. Consequently, the system will determine that the two coating specimens are not well matched, because its coating formulas have different effect pigment types. As a different example, if two colored sparkle coating specimens exhibit similar sparkle density, similar high color contrast between sparkle points and darker colored background, and similar colored sparkle gamuts, then the specimens can be described as having similar or matching colored sparkle appearance since its coating formulas have similar effect pigment types, with similar concentrations.

FIG. 1 is a simplified block diagram representation of an embodiment of a system 100 for evaluating and matching color and appearance of coatings, e.g., coatings containing at least one effect pigment type. For the illustrated embodiment, the system 100 is utilized to find at least one candidate coating specimen (assuming that one is available) that best matches the color and appearance of a coating sample 102 to be matched. The depicted simplified embodiment of the system 100 includes, without limitation: at least one digital image capture system 104; at least one computing system 106; and at least one coating specimen database 108. For simplicity, one digital image capture system 104, one computing system 106, and one coating specimen database 108 are shown and described. It should be understood that an implementation of the system 100 may include more than one of these elements, as appropriate for the particular embodiment. The elements of the system 100 communicate (via physical and/or wireless communication links) with one another as needed to support the described functionality of the system 100.

The coating sample 102 may reside on a substrate 110. The substrate 110 may be a vehicle, a component of a vehicle, a surface of a vehicle, or the like. The substrate 110 may also be any coated article that includes or carries the coating sample 102. For this particular example, the coating sample 102 is a colored coating that contains at least one effect pigment to provide a colored sparkle appearance. The coating sample 102 is formed in accordance with a particular production formulation that specifies the amount and type of constituent components used to fabricate the coating sample 102.

The digital image capture system 104 includes one or more digital cameras that can be operated to capture at least one digital image of the coating sample 102. In preferred embodiments, the digital image capture system 104 captures high resolution, high dynamic range (HDR) images. Moreover, the digital image capture system 104 is suitably configured and operated to capture digital images using multiple color measurement angles, e.g., four different angles. The dashed lines in FIG. 1 represent the field of view of a captured digital image of the coating sample 102. Digital images captured by the digital image capture system 104 are processed by the computing system 106. In some embodiments, the digital image capture system 104 is separate and distinct from the computing system 106. In other embodiments, the digital image capture system 104 and the computing system 106 are combined and implemented together in a single piece of hardware.

The system 100 includes or cooperates with the coating specimen database 108, which contains data corresponding to a number of coating specimens. As explained in more detail below, the coating specimen database 108 can be maintained to store color image data, color model properties data, histogram information derived from color image data, appearance data, and/or other characterizing data for any number of previously analyzed and characterized coating specimens. The coating specimen database 108 may be associated with the digital image capture system 104, associated with the computing system 106, and/or associated with a system or platform that is separate and distinct from the digital image capture system 104 and the computing system 106, such as in a server-based or in a cloud computing environment.

The computing system 106 executes at least one matching algorithm to compare colored sparkle characteristics of the coating sample 102 against corresponding colored sparkle characteristics of previously characterized coating specimens, with a goal of identifying candidate coating specimens that best match the colored sparkle appearance of the coating sample 102. To this end, the computing system 106 may be suitably configured to generate and output an appropriate output 112 that identifies the best matching candidate coating specimens for purposes of production and application (e.g., for repair or repainting of a vehicle body). The output 112 may be rendered on a display element, printed in a readable format, generated as audio content, or otherwise presented to a user 114 of the system 100.

Figure 2:
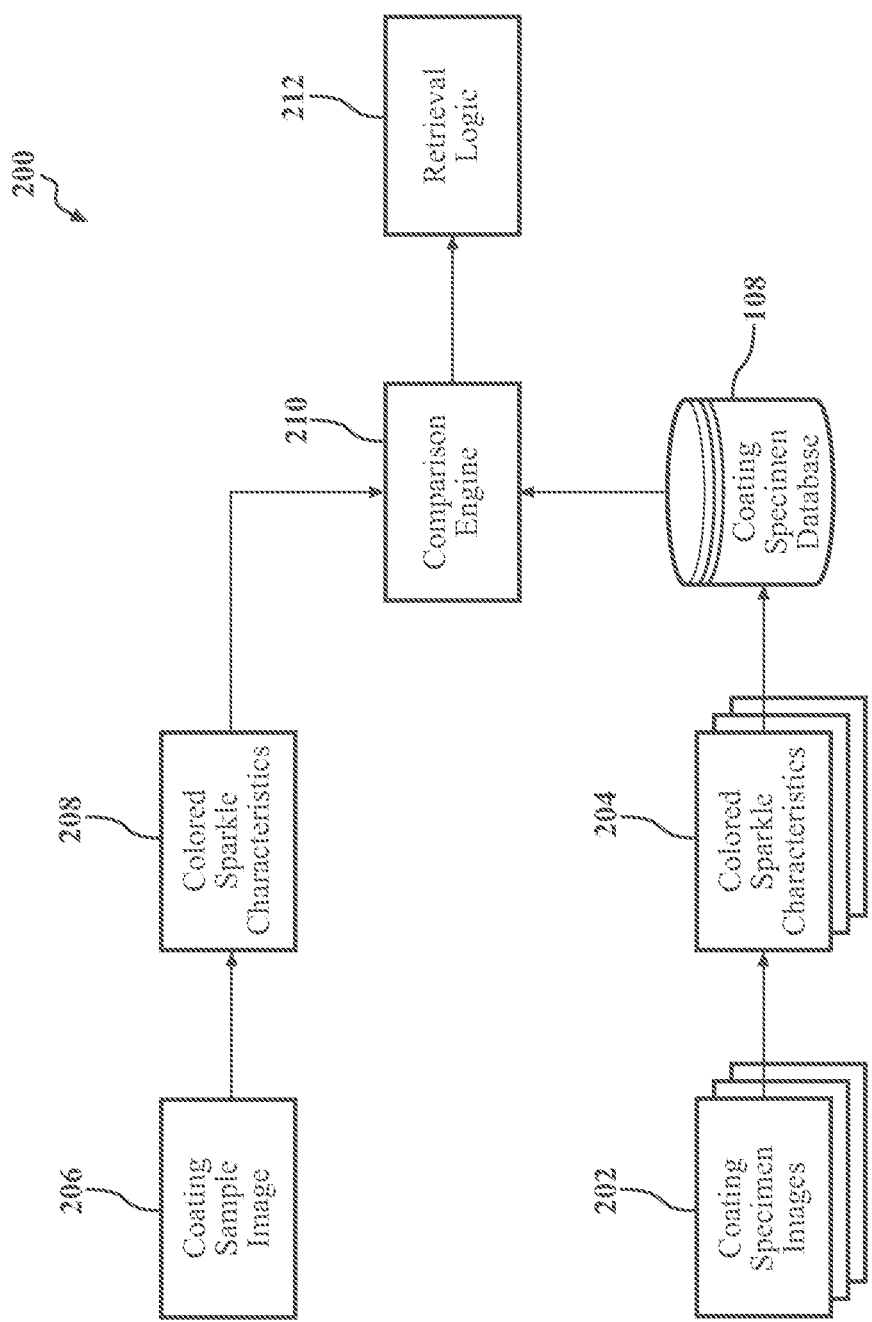
FIG. 2 is a simplified block and data flow diagram that illustrates a methodology for evaluating and matching color and appearance of coatings, in accordance with exemplary embodiments of the invention.

FIG. 2 is a simplified block and data flow diagram that illustrates a methodology 200 for evaluating and matching color and appearance of coatings, in accordance with exemplary embodiments. This description assumes that at least one coating specimen database 108 (as described with reference to FIG. 1) has already been populated with the relevant data associated with a number of coating specimens. To this end, coating specimen images 202 are captured, processed, and analyzed in an appropriate manner. As mentioned above, the captured images 202 are preferably HDR digital images captured from a plurality of different measurement angles. These captured images 202 are processed to obtain corresponding data, properties, and/or feature descriptors that define or otherwise specify the colored sparkle characteristics of different coating specimens (referred to here as colored sparkle characteristics data 204). The colored sparkle characteristics data 204, the coating specimen images 202, and other characterizing or identifying data are maintained in the coating specimen database 108 to allow the methodology 200 to compare previously characterized coating specimens against coating samples (which need not be previously characterized).

A coating sample image 206 is captured for a coating sample to be colored sparkle matched. As mentioned above, the captured image 206 is preferably an HDR digital image captured from a plurality of different measurement angles. The captured coating sample image 206 is processed and analyzed to obtain corresponding colored sparkle characteristics data 208 that characterizes the colored sparkle and appearance of that particular coating sample. Notably, the processing and analysis performed on the coating sample image 206 is consistent with the processing and analysis performed on the different coating specimen images 202, and the colored sparkle characteristics data 208 characterizes, defines, or describes the coating sample in the same manner as the colored sparkle characteristics data 204 for the coating specimens. This allows the methodology 200 to compare the colored sparkle appearance of the coating sample against one or more of the previously characterized coating specimens.

In certain embodiments, at least some aspects of the colored sparkle characteristics data 208 (obtained for the coating sample image 206) can be compared against at least some aspects of the colored sparkle characteristics data 204 (obtained for the coating specimen images 202). For example, the colored sparkle characteristics data may include, without limitation: sparkle strength values or measurements; sparkle texture values or measurements; visual texture values or measurements; colored sparkle visual scaling values, or measurements; pixel-based sparkle point color property data (colored sparkle gamut) or measurements. These items are described in more detail below. The colored sparkle characteristics data can be obtained for any colored sparkle measurement geometry set, and for any number of coating samples/specimens.

The methodology 200 may employ at least one suitable comparison metric, algorithm, or logic as appropriate for the particular embodiment and application. FIG. 2 depicts this comparison functionality as being implemented or executed by a comparison engine 210. In practice, the comparison engine 210 may incorporate and utilize various colored sparkle metrics, conventional color metrics, and other comparison metrics as needed to support the particular implementation of the methodology 200.

The results of the comparison can be used by appropriate retrieval logic 212 to retrieve information corresponding to one or more matching coating specimens. For example, the retrieval logic 212 can retrieve (from, e.g., the coating specimen database 108 and/or from another database) any of the following, without limitation: an identifier of a candidate coating specimen; descriptive data for a candidate coating specimen; colored sparkle or appearance data for a candidate coating specimen; a production formulation associated with manufacturing or mixing of a candidate coating specimen. In this regard, a production formulation for a well-matched coating specimen can be used to mix a coating composition that will be applied to the target surface of interest, e.g., a painted surface of a vehicle.

Figure 3:
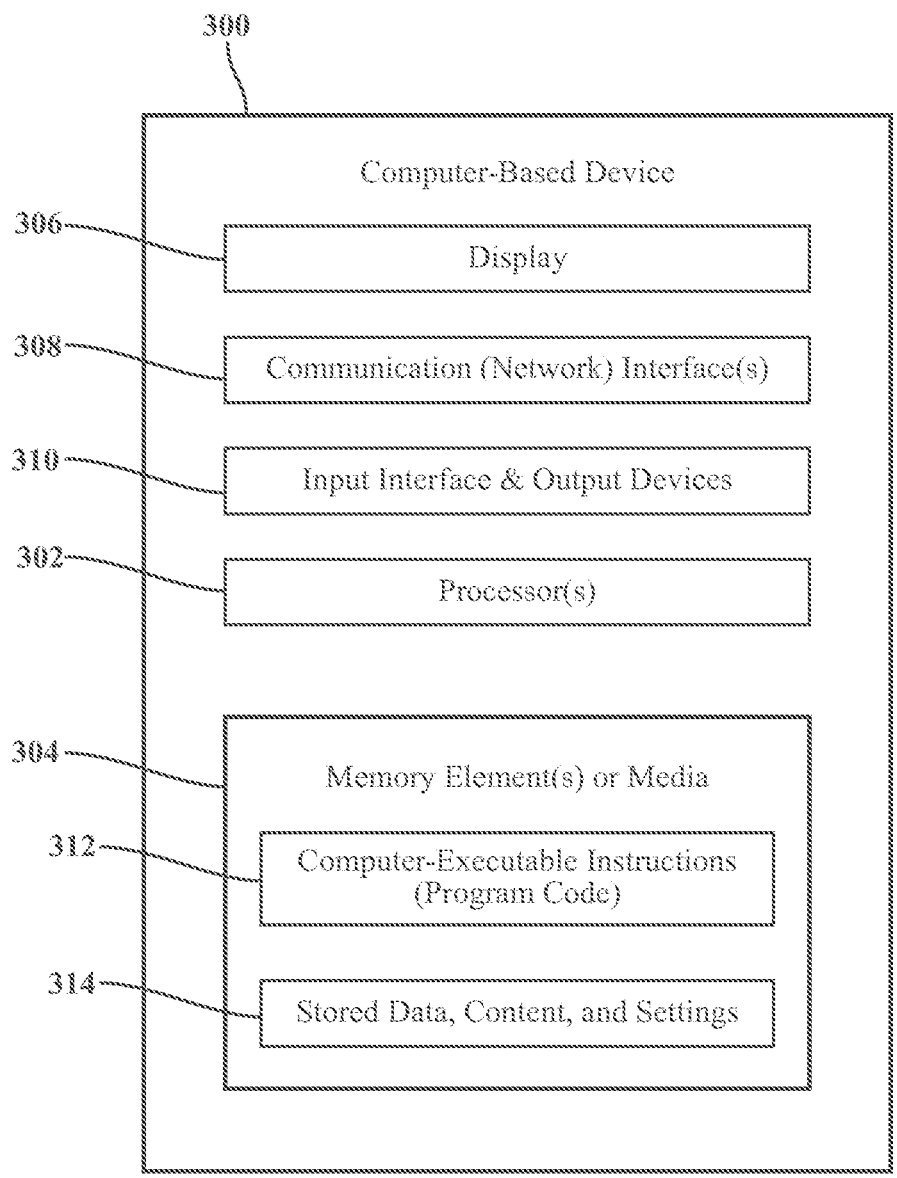
FIG. 3 is a block diagram of an exemplary embodiment of a computer-based device.

In accordance with certain embodiments, the system 100 depicted in FIG. 1 can be implemented using at least one computer-based or a processor-based device, system, or piece of equipment. Moreover, one or more items depicted in FIG. 2 can be implemented with or executed by at least one computer-based or a processor-based device, system, or piece of equipment. In this regard, FIG. 3 is a simplified block diagram representation of an exemplary embodiment of a computer-based device 300, which may be used to implement certain devices, systems, or components described here.

The device 300 generally includes, without limitation: at least one processor 302; at least one memory storage device, storage media, or memory element 304; a display 306; at least one communication (network) interface 308; and input and output (I/O) devices 310, such as an input interface, one or more output devices, one or more human/machine interface elements, or the like. In practice, the device 300 can include additional components, elements, and functionality that may be conventional in nature or unrelated to the particular application and methodologies described here.

A processor 302 may be, for example, a central processing unit (CPU), a field programmable gate array (FPGA), a microcontroller, an application specific integrated circuit (ASIC), or any other logic device or combination thereof. One or more memory elements 304 are communicatively coupled to the at least one processor 302, and can be implemented with any combination of volatile and non-volatile memory. The memory element 304 has non-transitory processor-readable and processor-executable instructions (program code) 312 stored thereon, wherein the instructions 312 are configurable to be executed by the at least one processor 302 as needed. When executed by the at least one processor 302, the instructions 312 cause the at least one processor 302 to perform the associated tasks, processes, and operations defined by the instructions 312. Of course, the memory element 304 may also include instructions associated with a file system of the host device 300 and instructions associated with other applications or programs. Moreover, the memory element 304 can serve as a data storage unit for the host device 300. For example, the memory element 304 can provide storage 314 for image data, color properties information, sensor data, measurements, settings or configuration data for the system, and the like.

The display 306 (if deployed with the particular embodiment of the device 300) may be integrated with the device 300 or communicatively coupled to the device 300 as a peripheral or accessory component. The shape, size, resolution, and technology of the display 306 will be appropriate to the particular implementation of the device 300. The display 306 can be realized as a monitor, touchscreen, or another conventional electronic display that is capable of graphically presenting data and/or information provided by the device 300.

The communication interface 308 represents the hardware, software, and processing logic that enables the device 300 to support data communication with other devices. In practice, the communication interface 308 can be suitably configured to support wireless and/or wired data communication protocols as appropriate to the particular embodiment. For example, the communication interface 308 can be designed to support a cellular communication protocol, a short-range wireless protocol (such as the BLUETOOTH communication protocol), and/or a WLAN protocol. As another example, if the device 300 is a desktop or laptop computer, then the communication interface can be designed to support the BLUETOOTH communication protocol, a WLAN protocol, and a LAN communication protocol (e.g., Ethernet).

The I/O devices 310 enable a user of the device 300 to interact with the device 300 as needed. In practice, the I/O devices 310 may include, without limitation: an input interface to receive data for handling by the device 300; a speaker, an audio transducer, or other audio feedback component; a haptic feedback device; a microphone; a mouse or other pointing device; a touchscreen or touchpad device; a keyboard; a joystick; a biometric sensor or reader (such as a fingerprint reader, a retina or iris scanner, a palm print or palm vein reader, etc.); a camera; a lidar sensor; or any conventional peripheral device. In this context, a touchscreen display 306 can be categorized as an I/O device 310. Moreover, a touchscreen display 306 may incorporate or be controlled to function as a fingerprint or palm print scanner. A haptic feedback device can be controlled to generate a variable amount of tactile or physical feedback, such as vibrations, a force, knock, or bump sensation, a detectable movement, or the like. Haptic feedback devices and related control schemes are well known and, therefore, will not be described in detail here.

Figure 4:
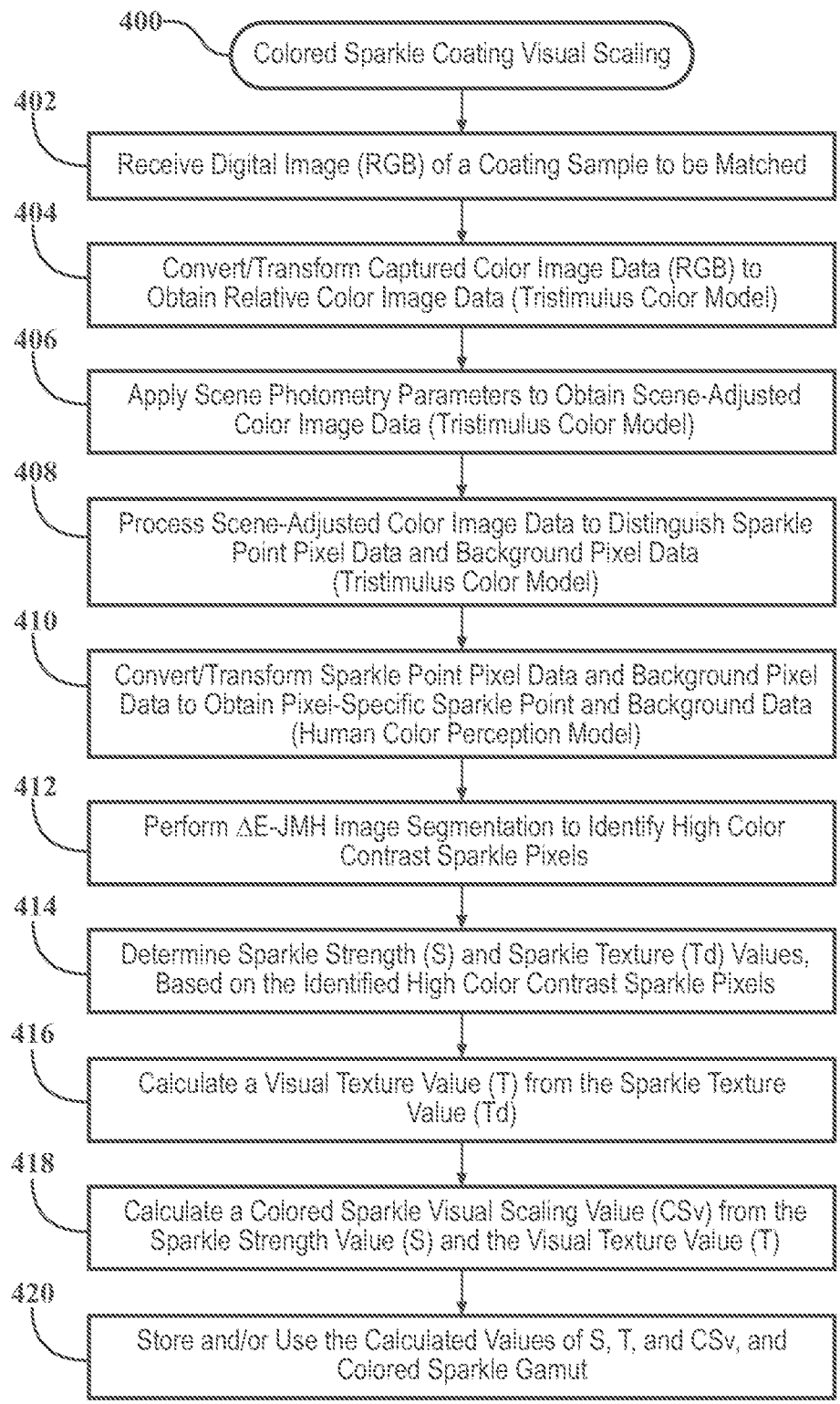
FIG. 4 is a flow chart illustrates an exemplary embodiment of a method of visually scaling the colored sparkle appearance of coatings containing at least one effect pigment type.
Figure 5:
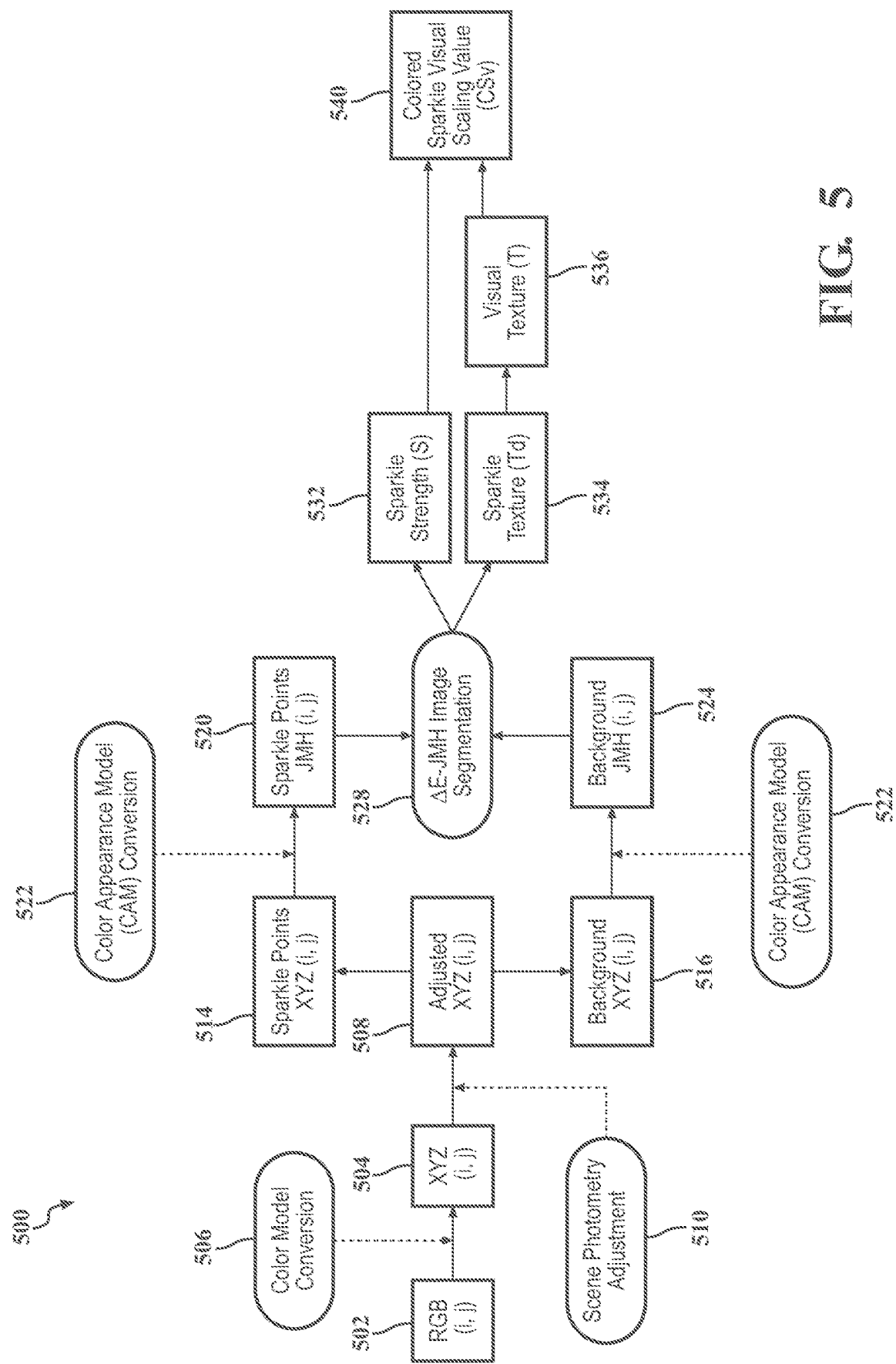
FIG. 5 is a block and data flow diagram that corresponds to processing consistent with the method shown in FIG. 4.

FIG. 4 is a flow chart that illustrates a process 400 that can be performed by a computing system of the type described here, and FIG. 5 is a block and data flow diagram of a methodology 500 that corresponds to processing consistent with an exemplary iteration of the process 400. The process 400 represents an exemplary embodiment of a method of visual scaling of colored sparkle appearance of coatings containing at least one effect pigment type. The various tasks performed in connection with a disclosed process may be performed by software, hardware, firmware, or any combination thereof. For illustrative purposes, the description of an illustrated process may refer to elements mentioned above in connection with FIGS. 1-3. It should be appreciated that an embodiment of an illustrated process may include any number of additional or alternative tasks, the tasks shown in the figures need not be performed in the illustrated order, and an illustrated process may be incorporated into a more comprehensive procedure or process having additional functionality not described in detail herein. Moreover, one or more of the tasks shown in a figure could be omitted from an embodiment of the illustrated process as long as the intended overall functionality remains intact.

Referring to FIG. 4 and FIG. 5, the process 400 can be performed when it's desirable to match the color/appearance of a colored sparkle coating sample (e.g., a coating that has already been applied to a surface of a vehicle) to one or more candidate colored sparkle coating specimens, such that a matching candidate coating specimen can be identified, mixed, and utilized. For example, a matching candidate can be fabricated for application to a repaired surface of a vehicle. The illustrated embodiment of the process 400 begins by receiving a digital image of a coating sample to be colored sparkle matched (task 402). As mentioned above, the digital image can be captured with any suitably configured digital image capture system, and the digital image is preferably an HDR digital image that is generated by combining or merging image data obtained from multiple exposure settings. The original digital image is represented by captured color image data that is formatted in accordance with a first color model. In certain non-limiting embodiments, the first color model is an RGB color model, which may be a native format used by the digital image capture system. Any multi-color-band, or multi-spectral camera would also be applicable. In this regard, FIG. 5 depicts the received digital image 502 in RGB format, where the (i, j) notation refers to pixel location of the image.

In accordance with the illustrated embodiment, the process 400 continues by converting or transforming the captured color image data into corresponding relative color image data (task 404). The resulting relative color image data is formatted in accordance with a relative tristimulus color model, both based on RGB2XYZ transform, or based on any multi-color-band or multispectral to XYZ transform. As one non-limiting example, the relative color image data may be formatted in accordance with the XYZ color model, which models standard or normal human color vision at the human sensory level (e.g., the human retina response). To this end, FIG. 5 depicts the relative color image data 504, which is obtained by subjecting the received digital image 502 to an appropriate color model conversion routine 506, both based on RGB2XYZ transform, or based on any multi-color-band or multispectral to XYZ transform. The process 400 continues by applying at least one scene photometry parameter to the relative color image data, to obtain scene-adjusted color image data (task 406). The resulting scene-adjusted color image data is formatted in accordance with an absolute tristimulus color model, such as the XYZ color model. To this end, FIG. 5 depicts the scene-adjusted color image data 508, which is obtained by subjecting the relative color image data 504 to an appropriate scene photometry adjustment routine 510.

The system and methodology described here utilize task 406 and the scene photometry adjustment routine 510 to contemplate realistic lighting conditions and observation environments (e.g., real world viewing conditions at a typical vehicle repair facility, where the actual coating sample to be matched is located and/or where a matching candidate coating specimen is to be applied to a vehicle). These realistic conditions are considered to better emulate or predict the human visual response when comparing a coating specimen to the coating sample that is to be colored sparkle matched.

In certain implementations, task 406 applies a light intensity value and/or an illuminance level (measured in lux) as a scene photometry parameter, wherein the applied light intensity value and/or illuminance level is associated with a typical observation environment for the coating sample to be matched. In certain implementations, task 406 applies a lamp type (e.g., spectral power distribution, color temperature) as a scene photometry parameter, wherein the applied lamp type is associated with a typical observation environment for the coating sample to be matched. For example, in refinish field conditions it is typical to use portable white LED lamps, with variable light intensity (illuminance level), and different color temperature (bluish-white versus yellowish white). All this information is typically measured by special spectrophotometers (tele-spectroradiometers). The complete visible light, wavelength by wavelength, with its relative spectral intensities, is named spectral power distribution (SPD), or lamp spectrum. In addition, bluish-white LED lamps, or additionally, xenon lamps (as present in high-quality car front lights), are excellent simulators of the natural daylight (D65 under the CIE terminology). In accordance with certain exemplary embodiments, the colored sparkle model described here is mainly based on xenon lamps, with 5000 lux, emulating the outdoor conditions typically experienced when comparing vehicle bodies, and bluish-white LED lamps in refinish lighting conditions (portable lamps, and, directional lighting booths).

The specific values, quantities, or levels applied during task 406 and the scene photometry adjustment routine 510 can be determined by spectroradiometrically measuring and recording any number of real lighting and observation environments, such that one or more typical evaluation environments can be estimated and characterized. The characterized environment(s) with associated scene photometry values, quantities, or levels can be saved for subsequent use. Alternatively or additionally, the particular values, quantities, or levels applied during task 406 and the scene photometry adjustment routine 510 may be variable, dynamically determined in real time or substantially real time, user-configurable, or the like.

In accordance with the depicted embodiment, the scene-adjusted color image data is processed in an appropriate manner to identify, separate, or otherwise distinguish constituent sparkle point pixel data and constituent background pixel data (task 408). The constituent sparkle point pixel data and the constituent background pixel data are both formatted in accordance with the absolute tristimulus color model. The processing at task 408 identifies pixels or groups of pixels that exhibit relatively high luminance levels (in $cd/m^2$) and pixels or groups of pixels that exhibit relatively low luminance levels. Higher luminance levels are indicative of sparkle points (associated to disoriented flakes behaving as micro-mirrors for that viewing sparkle geometry), and lower luminance levels are indicative of non-sparkle or background points. The process 400 may use a luminance threshold to define which pixels of the scene-adjusted color image data correspond to sparkle point pixel data, and which correspond to background pixel data. FIG. 5 shows the sparkle point pixel data 514 and the background pixel data 516 as separate blocks.

In accordance with certain embodiments, the process 400 continues by converting or transforming the constituent sparkle point pixel data into pixel-specific sparkle point data, and by converting or transforming the constituent background pixel data into pixel-specific background data (task 410). The conversion at task 410 results in color image data that is formatted in accordance with an advanced color appearance model, which models human color perception. In other words, task 410 converts the color model of the pixel-based color image data from a human retina model to a human brain or visual cortex model, increasing the high-contrast of the sparkle points on darker colored background initially encoded in the RGB captured images. Consequently, the process 400 converts the captured color image data (in RGB format) into pixel-specific sparkle point data and pixel-specific background data (in a human color perception format) using the absolute XYZ model as bridge. As one non-limiting example, the advanced color appearance model may be a JMH model, where J is a number that represents lightness (white-relative brightness), M is a number that represents colorfulness or color saturation, and H is a number that represents color hue.

FIG. 5 illustrates the pixel-specific sparkle point data 520, which is obtained by subjecting the constituent sparkle point pixel data 514 to an appropriate color appearance model conversion routine 522. Likewise, the pixel-specific background data 524 is obtained by subjecting the constituent background pixel data 516 to the color appearance model conversion routine 522. As labeled in FIG. 5, for this particular implementation, the pixel-specific sparkle point data 520 and the pixel-specific background data 524 are both defined in accordance with the JMH advanced color appearance model.

The process 400 may continue by performing an appropriate segmentation routine on the pixel-specific sparkle point data and the pixel-specific background data to identify sparkle point pixels that exhibit visually distinguishable sparkle effects that satisfy a color difference ($\Delta E$) threshold in accordance with the advanced color appearance model (task 412). In accordance with certain embodiments, task 412 performs a $\Delta E$-JMH image segmentation routine to identify high color contrast sparkle pixels. The segmentation performed at task 412 is based on color differences between sparkle point pixels versus darker colored background in the image under analysis. FIG. 5 depicts the $\Delta E$-JMH image segmentation routine 528 operating on the pixel-specific sparkle point data 520 and the pixel-specific background data 524.

In accordance with certain embodiments, the segmentation performed at task 412 processes the pixel-specific sparkle point data 520 and the pixel-specific background data 524 to obtain corresponding pixel-specific $\Delta E$-JMH values (color difference data) for the image under analysis. For example, the $\Delta E$-JMH value for a given pixel can range from 0 to 100, wherein a value of 0 indicates a background pixel having no detectable color difference, and a value of 100 indicates a sparkle pixel having a very high and distinguishable color difference. In practice, the upper value need not be 100, and it could be less than or greater than 100 in certain implementations, and always depending on the effect coating formulation. An image of a typical colored sparkle coating will exhibit a vast number of background pixels ($\Delta E$-JMH values close to 0) with randomly distributed sparkle points or regions ($\Delta E$-JMH values above a certain threshold that defines whether a pixel is a colored sparkle pixel or a background pixel). The $\Delta E$-JMH threshold used for this determination may vary from one embodiment to another, and need not be fixed for any given implementation, but it is always based on the statistical nature of the high-contrast sparkle points (intensity) histogram, easily fitted by statistical distributions as Gaussian, Gamma, etc., where average, median, standard deviation, quartiles, percentiles, etc. can be used. In accordance with one non-limiting example, the $\Delta E$-JMH threshold is 11.5 according to Gamma statistics and 95% percentile, such that $\Delta E$-JMH values higher than 11.5 are assumed to indicate high-contrast colored sparkle pixels encoded in the long right tail of the sparkle points histogram, and such that $\Delta E$-JMH values less than or equal to 11.5 are assumed to indicate background pixels, even pixels that correspond to disoriented flakes not behaving as micro-mirrors for that viewing sparkle geometry.

Notably, a colored sparkle region may include a number of high color contrasting pixels surrounded by a number of less color contrasting pixels, which in turn are surrounded by a number of low color contrasting pixels. The segmentation routine performed at task 412 identifies and locates the colored sparkle regions, points, and corresponding pixels to distinguish them from the background pixels. The process 400 assumes that the spatial pattern of colored sparkle regions, points, and pixels is representative of the colored sparkle appearance of the overall coating, as perceived by a human observer, and at close distance (0.5 meters for instance).

In certain implementations, the segmentation performed at task 412 recursively counts the colored sparkle regions without repetition, starting with the region with the highest peak ΔE-JMH value(s), computing its average around a mask centered in its peak (e.g., a 25×25 pixel mask), and finally removing this first identified region (diffraction-limited segmentation unit, dependent of the real viewing distance of the human observer seeing the sample/specimen, e.g., at about 0.5 meters). Thereafter, the segmentation routine repeats to search for the next colored sparkle region with the highest peak ΔE-JMH value(s). This procedure is repeated to ensure adequate coverage of the entire image under analysis, and is preferably repeated for all of the pixel-based image data such that all of the highest color contrast areas have been identified and located.

Referring again to FIG. 4 and FIG. 5, the illustrated embodiment of the process 400 continues by determining a sparkle strength value (S) and a sparkle texture value (Td) for the coating sample to be colored sparkle matched (task 414). For the described example, S is a unitless number that is indicative of high color contrast, and Td is a number that is indicative of physical density of sparkle points (for this example, Td has units of mm$^{-2}$ or the number of sparkle points per mm$^2$). The values of S and Td are determined from the pixel-specific sparkle point data and the pixel-specific background data. More specifically, the values of S and Td are determined in response to the outcome of the ΔE-JMH segmentation routine 528. In this regard, FIG. 5 depicts the sparkle strength value 532 and the sparkle texture value 534 being obtained as a result of the ΔE-JMH segmentation routine 528.

Td is defined as a physical density of the sparkle points present in the total image, based on the known individual pixel area, and representative of the overall coating. Accordingly, Td can be easily calculated after counting the number of colored sparkle points that are obtained after ΔE-JMH segmentation is complete. In certain embodiments, S is calculated as a function of the ΔE-JMH values. More specifically, S is calculated from the ΔE-JMH values of the segmented image data, i.e., the pixels that have been declared to be colored sparkle points having high color contrast. For this particular non-limiting example, S is calculated as the average of the segmented ΔE-JMH values, but always subtracting the threshold value (e.g., 11.5). Consequently, a coating with strong sparkle effects or very high colored sparkle contrast will have a relatively high value of S, while a coating with weak sparkle effects or less colored sparkle contrast will have a relatively low value of S.

Notably, when light intensity and/or lamp type of the observation environment changes, the values of Td and S change for a colored sparkle coating under analysis. The process 400 is able to contemplate such environmental changes and accurately compute the values of Td and S in a responsive manner. In this way, the disclosed colored sparkle methodology is a lighting-adaptive methodology. When light intensity and/or lamp type changes, the captured RGB images change, which in turn varies the JMH image data information of the background and sparkle points. Although the spatial pattern (the distribution of sparkle points within a non-sparkle background, or texture) is image-fixed, the sparkle point intensity histogram, after segmentation, can reflect some variations, which impact on the values of S and Td.

Referring again to FIG. 4 and FIG. 5, the illustrated embodiment of the process 400 continues by calculating a visual texture value (T) for the coating sample to be colored sparkle matched (task 416). FIG. 5 shows the visual texture value 536 being obtained from the sparkle texture value 534. For the described example, T is calculated as a function of Td, based on the following expression:

$$T = \alpha T_d^\eta \qquad (1.0)$$

In expression 1.0, α and η are constants that are computed by a supervised machine learning method (non-linear regression) using instrumental and visual data. In expression 1.0, α is always a positive number, e.g., 3, 11, or the like. Moreover, the absolute value of η is less than one, and its final sign (positive or negative) is conditioned by the lighting conditions of the visual experiment for the colored sparkle visual scaling.

In practice, the raw (imaging) quantities, Td and S, cannot be directly used to predict the visual texture of the colored sparkle. Td, as a physical density of sparkle points, cannot be easily and accurately estimated by a human observer. On the other hand, a human observer can estimate something related to the visual density of sparkle points (e.g., the value of T). Thus, for colored sparkle appearance, any observer with basic training should be able to discern samples with low or high visual density (T) of sparkle points with similar S values. Although the process 400 obtains computer vision quantities (Td and S), these values are not directly related or proportional to the perceptual T and S values encoded by human brains. Accordingly, the visual texture value (T) is a more efficient and accurate value to use in visual scaling and comparison of coating samples. The above expression 1.0 for T leverages visual experiments and is a good predictor of the visual density of sparkle points. The visual experiment for the colored sparkle visual scaling, also covering the conversion of Td into T, can be psychophysically designed and executed following methods as multidimensional scaling, maximum likelihood difference scaling, etc., using a rich variety of colored sparkle samples under directional lighting conditions replicating target field conditions.

Referring back to FIG. 4, the illustrated embodiment of the process 400 continues by calculating a colored sparkle visual scaling value for the coating sample to be colored sparkle matched (task 418). The calculated colored sparkle visual scaling value can be stored and/or used as needed (task 420). One or more of the other colored sparkle characteristics or parameters (e.g., the calculated values of S, Td, and T, and colored sparkle gamut) and the related color image data may also be stored and/or used as needed or required by the particular application. For example, the computed values of CSv, T, and S for the coating sample can be utilized in a colored sparkle matching and retrieval process that searches for colored sparkle coating specimens that match the colored sparkle characteristics of the coating sample.

As schematically depicted in FIG. 5, the colored sparkle visual scaling value (CSv) 540 is calculated as a function of the sparkle strength value 532 and the visual texture value 536. Thus, the colored sparkle visual scaling value 540 is calculated based on the pixel-specific sparkle point data 520 and the pixel-specific background data 524. The resulting colored sparkle visual scaling value 540 may be expressed as a unitless number that indicates colored sparkle characteristics of the coating sample to be colored sparkle matched. In accordance with certain non-limiting embodiments, typical values of CSv may range from about 1.0 to about 20, where CSv=0 indicates a lack of colored sparkle appearance, typically representative of coatings without effect pigments.

In accordance with certain embodiments, the colored sparkle visual scaling value 540 is calculated from the colored sparkle characteristics of the identified sparkle pixels (i.e., based on the sparkle points obtained after performing the ΔE-JMH segmentation routine 528). For this particular example, the colored sparkle visual scaling value 540 is a function of the visual texture value (T) and the sparkle strength value (S):

$$CSv = \beta\sqrt{TS} - \text{offset} \qquad (2.0)$$

In expression 2.0, β and offset are constants that are computed by a supervised machine learning method (non-linear regression) using instrumental and visual data. For this particular application, the values of β and offset in expression 2.0 can be any positive number, e.g., 0.5 for β, and 2.7 for offset (other values may be used, depending on the particular embodiment and application). These constants are experimentally determined based on human observation and comparison of colored sparkle samples, such that higher values of CSv correspond to coating samples that are observed as having higher amounts of colored sparkle effects. In accordance with certain non-limiting embodiments. β=0.5 and offset=2.7.

The colored sparkle visual scaling value (CSv) represents a simple numerical scale—based on a relationship between the physical texture value (Td), the visual texture value (T), and the sparkle strength value (S)—that can serve as a colored sparkle metric when comparing different colored sparkle coatings against each other. Applying a supervised machine learning method (non-linear regression) between visual experimental data and system-generated data (Td, raw S), and exploring different non-linear functions (polynomials, etc.), the most efficient non-linear function has been determined to be a square root based function with a scaling factor (β) and the offset value, as mentioned above. As Td and raw S are determined under known lighting conditions (light intensity and lamp type), any variation in these lighting conditions can impact the values of Td and S. Consequently, the visual experimentation can be repeated, and the same supervised machine learning method can be utilized to adjust the various parameters (α, η, β, offset) to maintain an accurate correlation between visual perception and system output, which in turn provides excellent colored sparkle predictability performance.

Figure 6:
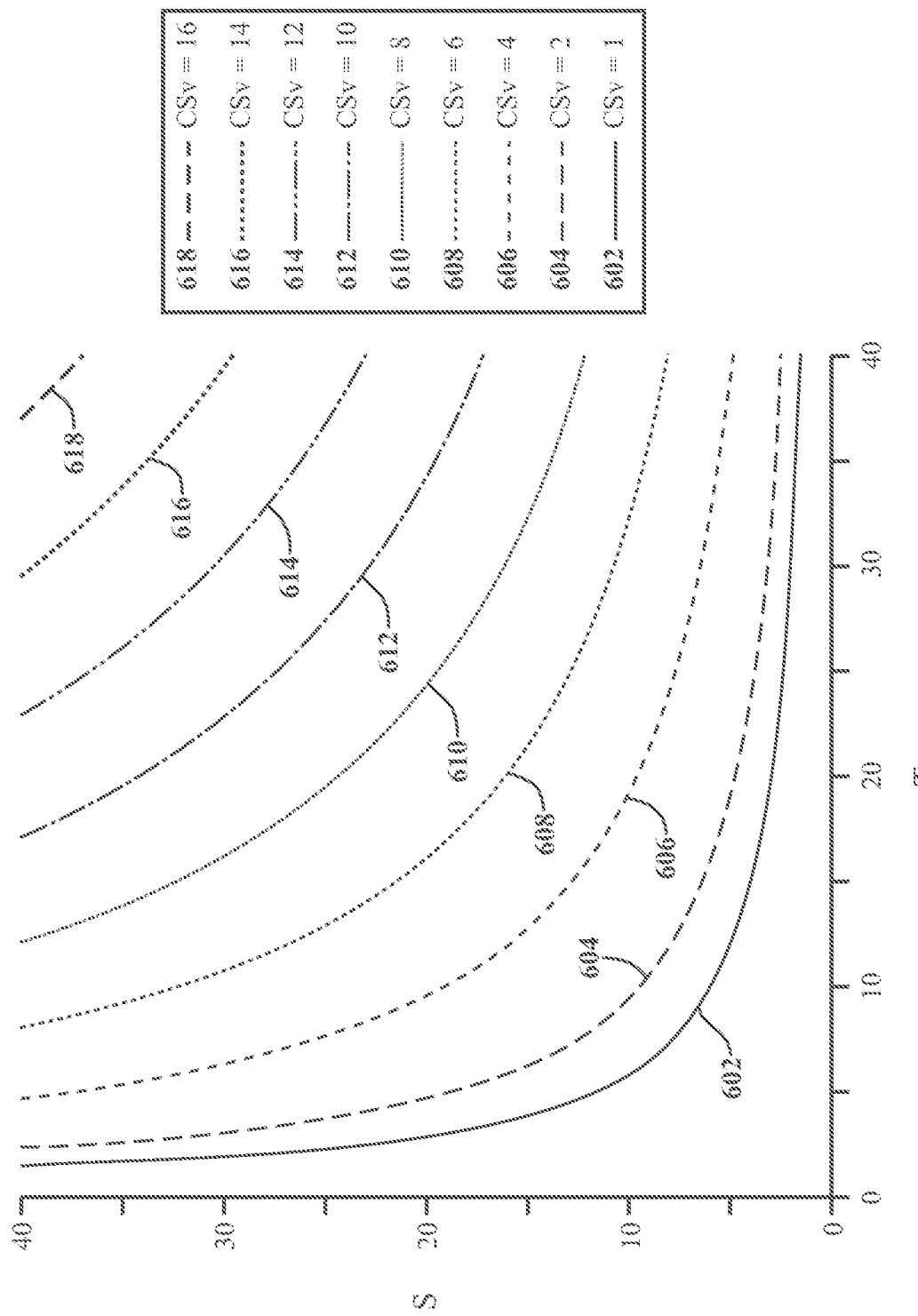
FIG. 6 is a diagram that includes plots of different colored sparkle visual scaling values.

FIG. 6 is a diagram that includes plots of different colored sparkle visual scaling values. The plots, the associated values of S and T, and the different colored sparkle visual scaling values shown in FIG. 6 are provided as several examples to assist in the description and understanding of the colored sparkle visual scaling value (CSv) and its relationship with the sparkle strength value (S) and the visual texture value (T). In practice, the characteristics, properties, and visualization of a given CSv plot need not be as depicted in FIG. 6. Although unimportant for purposes of this description, the plots in FIG. 6 represent CSv values for different coatings observed under the following lighting conditions: 15 degree illumination angle; 0 degree viewing angle; Xenon lamp; 5,000 lux.

In FIG. 6, the vertical axis represents S and the horizontal axis represents T. Accordingly, each plot of CSv demonstrates how the particular values of S and T influence the value of CSv. FIG. 6 depicts eight different CSv plots and includes a legend that indicates the CSv for each plot. More specifically: the plot 602 represents CSv=1; the plot 604 represents CSv=2; the plot 606 represents CSv=4; the plot 608 represents CSv=6; the plot 610 represents CSv=8; the plot 612 represents CSv=10; the plot 614 represents CSv=12; the plot 616 represents CSv=14; and the plot 618 represents CSv=16. Other CSv values will be associated with non-intersecting plots that reside between two of the depicted plots.

As explained in more detail below, the colored sparkle visual scaling value 540 can be utilized when performing an initial test or filter for colored sparkle matching against a candidate coating specimen. In this regard, the colored sparkle visual scaling value 540 may be a component in determining how well a candidate coating specimen matches the coating sample to be colored sparkle matched. To this end, the coating specimen database 108 (see FIG. 1) includes colored sparkle visual scaling values and other characterizing information (e.g., the captured RGB color image data and any of the converted/transformed representations of that color image data, corresponding values of T, S, and Td, colored sparkle gamut, etc.) that have been calculated for various candidate coating specimens. The data maintained in the coating specimen database 108 can be accessed as needed for consideration by the comparison engine 210.

Figure 7:
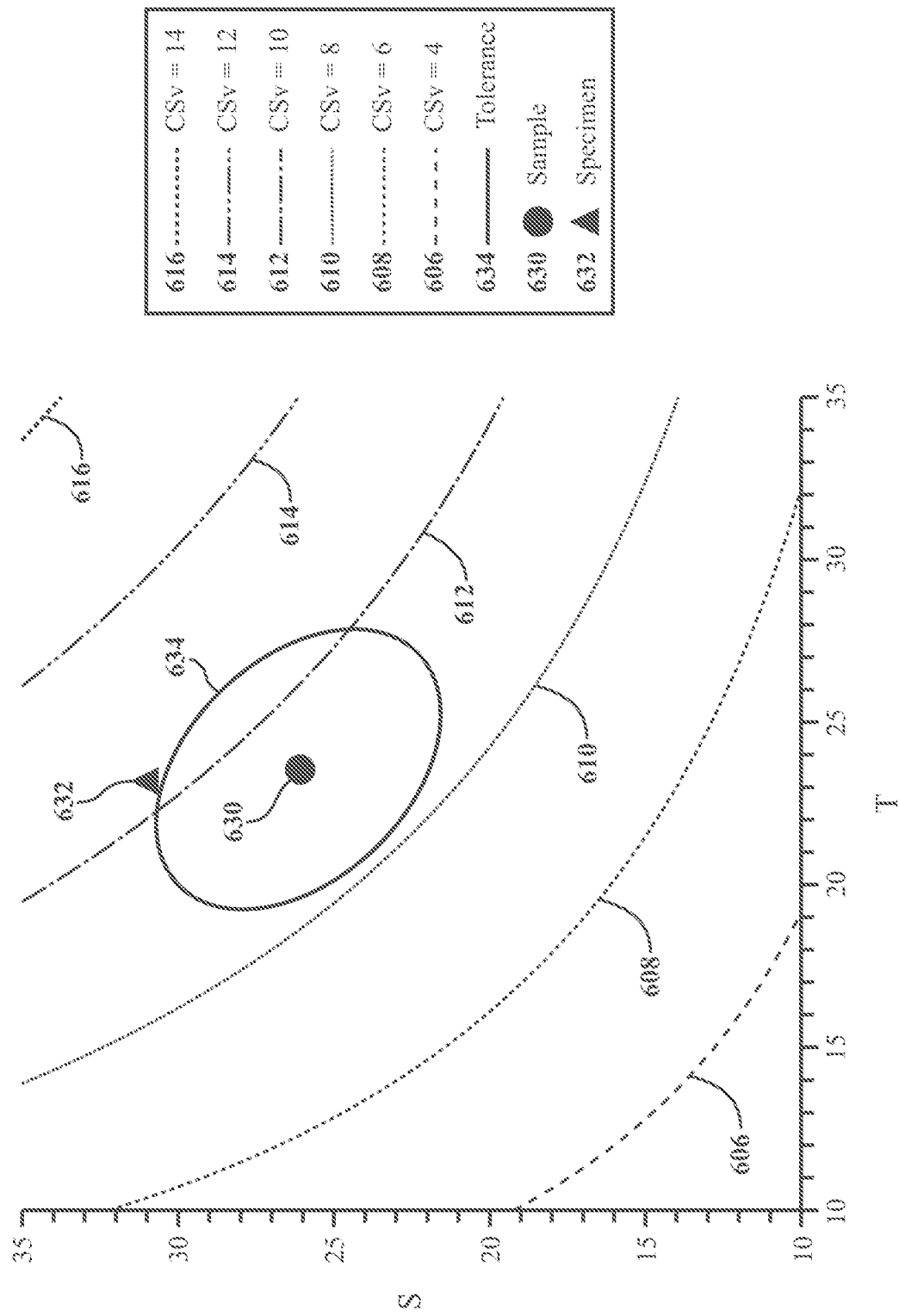
FIG. 7 is a diagram that includes plots of different colored sparkle visual scaling values and markers corresponding to a coating sample (with its visual colored sparkle tolerance region) and a candidate coating specimen.

FIG. 7 is a diagram that includes plots of different colored sparkle visual scaling values and markers corresponding to a coating sample and a candidate coating specimen. More specifically, FIG. 7 depicts a portion of the plots 606, 608, 610, 612, 614, and 616 that are also shown in FIG. 6. FIG. 7 also includes: a marker 630 that indicates the S, T, and CSv values of a coating sample that is to be colored sparkle matched; a marker 632 that indicates the S, T, and CSv values of a candidate coating specimen; and a region 634 that represents an exemplary visual matching tolerance that can be utilized when comparing the candidate coating specimen against the coating sample that is to be colored sparkle matched.

In accordance with certain embodiments, the region 634 is elliptical, centered about the marker 630 for the coating sample, and sized to define a particular colored sparkle threshold that is used to determine how well the colored sparkle characteristics of the candidate coating specimen match the colored sparkle characteristics of the coating sample. The elliptical shape of the region 634 contemplates the predictable plot shape and contour for different values of CSv (as exhibited by the plots shown in FIG. 6 and FIG. 7). It should be appreciated that alternative embodiments can utilize a tolerance region that is non-elliptical and shaped as desired to suit the needs and requirements of the particular application. FIG. 7 illustrates a scenario where the marker 632 for the candidate coating specimen is located outside of the region 634. Consequently, the candidate coating specimen corresponding to the maker 632 is deemed to be a poor match (with similar visual texture T as the sample but clearly different strength S) with the coating sample that is represented by the marker 630.

Figure 8:
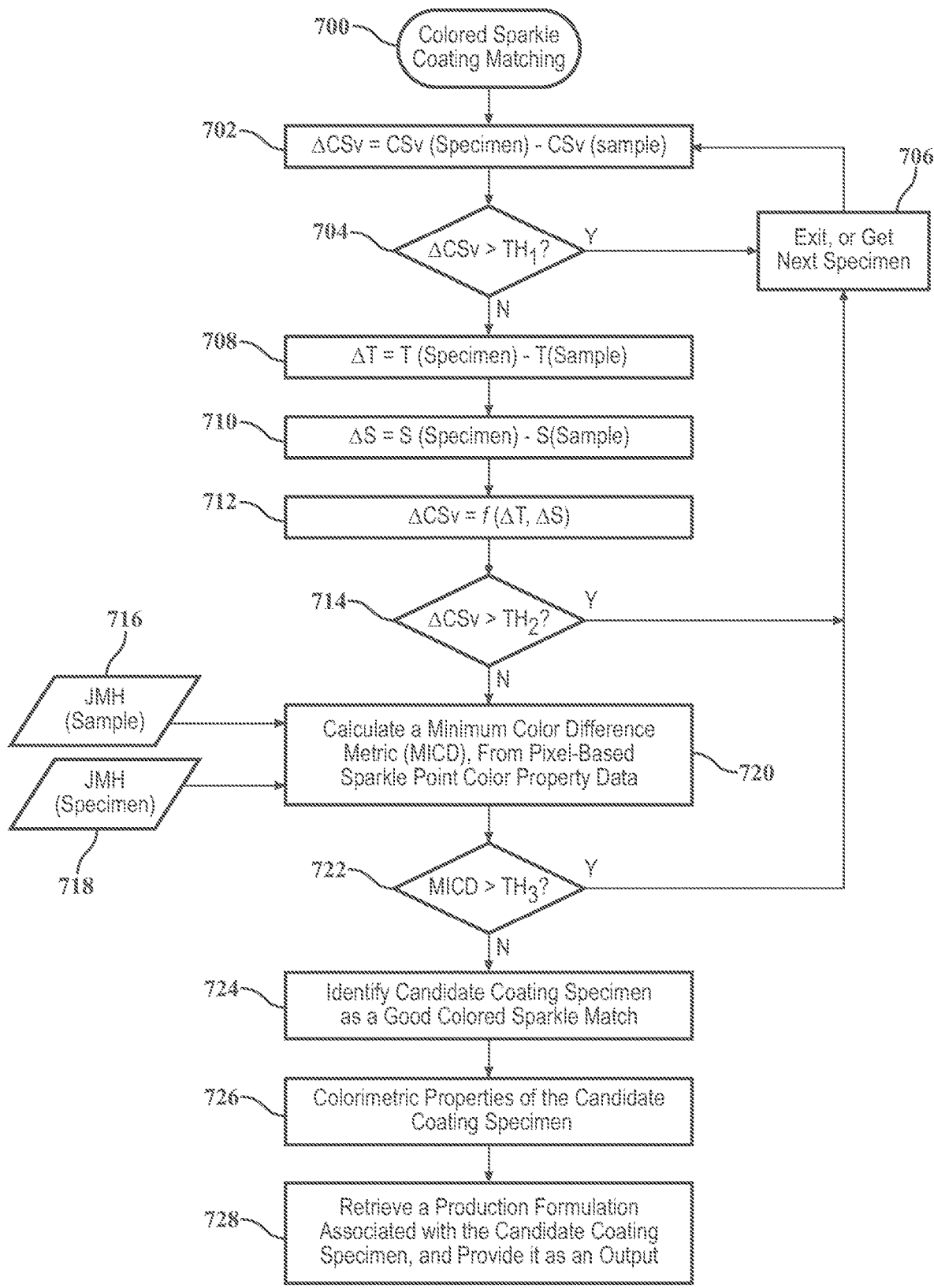
FIG. 8 is a flow chart illustrates an exemplary embodiment of a method of matching colored sparkle appearance of coatings containing at least one effect pigment type.

FIG. 8 is a flow chart that illustrates a process 700 that can be performed by a computing system of the type described here. The process 700 represents an exemplary embodiment of a method of matching colored sparkle appearance of coatings containing at least one effect pigment type. The following description of the process 700 assumes that the following characterizing values have already been calculated for the coating sample to be matched and for at least one candidate coating specimen: CSv, T, S, and colored sparkle gamut. In accordance with the exemplary embodiment described here, the process 400 is performed to obtain these characterizing values.

The illustrated embodiment of the process 700 begins by retrieving or accessing the colored sparkle visual scaling values (CSv) for the coating sample and the candidate coating specimen, which are to be color sparkle matched. As mentioned above, the CSv of the coating sample indicates the colored sparkle characteristics of the coating sample, and the CSv of the candidate coating specimen indicates the colored sparkle characteristics of the candidate coating specimen. The process 700 continues by comparing the CSv of the coating sample against the CSv of the candidate coating specimen, by calculating a visual scaling difference (task 702). For this example, the visual scaling difference (ΔCSv) is the absolute value of the difference between the two colored sparkle visual scaling values. The visual scaling difference is compared against a visual scaling threshold value, $TH_1$ (query task 704). The colored sparkle visual scaling threshold value is used to determine whether the candidate coating specimen poorly matches the coating sample that is to be colored sparkle matched. More specifically, the process 700 determines that the candidate coating specimen poorly matches the coating sample when the visual scaling difference is greater than the visual scaling threshold value (i.e., when ΔCSv>$TH_1$). In this way, the process 700 makes an initial determination of how well the candidate coating specimen matches the coating sample, and this initial determination is based on the two CSv values. The defined value of $TH_1$ can vary from one embodiment to another, as appropriate for the particular application. In accordance with the non-limiting example contemplated here, $TH_1$ can be within the range of about 2.0 to 4.0, and is preferably about 3.0.

The perpendicular CSv tolerance is the CSv tolerance, and from the visual experiment of the colored sparkle visual scaling, this value is around 2.0. That is, in FIG. 6 parallel CSv curves (4 vs. 6, etc.) means regions where the colored sparkle appearance is clearly distinguishable. For this reason, colored sparkle visual scaling differences >3 or higher indicate poor colored sparkle matching. However, due to the square root of CSv equation, different effect coatings with different (T, S) pairs can share the same CSv, but visually having ΔT and/or ΔS values higher than colored sparkle tolerances, so these coatings are not colored sparkle matched even though the colored sparkle visual scaling difference is close to zero. Therefore, the colored sparkle visual scaling difference is the first screening, as a "gross filter", but not the most relevant (acute or fine) for final colored sparkle matching screening.

If ΔCSv>$TH_1$ (the "Yes" branch of query task 704), then the process 700 declares that the candidate coating specimen under analysis does not match the coating sample. At this point, the process 700 may exit or proceed to check the next candidate coating specimen (task 706). FIG. 8 depicts task 706 leading back to task 702, so that the initial test based on colored sparkle visual scaling values can be repeated for the next candidate coating specimen. If the difference in visual scaling values is not greater than $TH_1$ (the "No" branch of query task 704), then the process 700 continues with at least one additional test or check to determine how well the candidate coating specimen matches the colored sparkle characteristics of the coating sample. In this regard, a "No" decision at query task 704 indicates that the currently selected candidate coating specimen passes the initial test for colored sparkle matching with the coating sample. Although the matching criteria associated with query task 704 can be used to obtain a good approximation of colored sparkle matching, the process 700 includes additional tests (described below) that increase the accuracy of matching decisions.

In accordance with certain embodiments, the next test/check performed by the process 700 is based on the previously calculated values of sparkle strength (S) and visual texture (T). To this end, the process 700 computes a visual texture difference (ΔT) between the visual texture value for the candidate coating specimen and the visual texture value for the coating sample that is to be colored sparkle matched (task 708). For this example, the visual texture difference (ΔT) is the difference between the two visual texture values. Similarly, the process 700 computes a sparkle strength difference (ΔS) between the sparkle strength value for the candidate coating specimen and the sparkle strength value for the coating sample that is to be colored sparkle matched (task 710). For this example, the sparkle strength difference (ΔS) is the difference between the two sparkle strength values. The signs (positive or negative) of ΔT and ΔS are useful to detect the partial deviations in visual texture and strength, respectively, but the magnitude (absolute value) is more relevant for the final colored sparkle difference (ΔCS). The signs of ΔT and ΔS can be useful to adjust the color formulation of the specimen to match the colored sparkle difference (ΔCS) with respect to the coating sample.

The process 700 continues by computing a colored sparkle difference (ΔCS) between the candidate coating specimen and the coating sample that is to be colored sparkle matched (task 712). As indicated in FIG. 8, ΔCS is computed as a function of ΔT and ΔS, and it represents a difference of colored sparkle spatial patterns of the candidate coating specimen and the coating sample. ΔCS is also indicative of the macro-texture difference between the candidate coating specimen and the coating sample.

In accordance with certain embodiments, ΔCS is initially computed in an elliptical form that contemplates an elliptically shaped tolerance region (as described above with reference to the region 634 in FIG. 7). In particular, ΔCS is computed in accordance with the following expression:

$$\Delta CS = \sqrt{\left(\frac{\Delta T_x}{d(\phi)*T_\phi}\right)^2 + \left(\frac{\Delta S_y}{d(\phi)*T_{CS_v}}\right)^2} \quad (3.0)$$

In expression 3.0, $T_k$ are the colored sparkle tolerances: $T_\phi$ is the tangential colored sparkle tolerance, and $T_{CS_v}$ is the perpendicular colored sparkle tolerance. And $d(\phi)$ is the parameter associated to the inclination angle of the tolerance ellipse (between 0 and 90 degrees). These three parameters are always computed by knowing the (T, S) pair of the coating sample (standard, vehicle part, etc.). $\Delta T_x$ and $\Delta S_y$ are computed from the instrumental ΔT, ΔS and the rotation matrix derived from the inclination angle of the tangent line in (T, S) point for the coating sample (standard, etc.).

The elliptical form of ΔCS can be converted into a circular form to simplify processing and analysis. In this regard, ΔCS can also be computed in accordance with the following expression (circular form):

$$\Delta CS = \sqrt{(\Delta T'_x)^2 + (\Delta S'_y)^2} \quad (4.0)$$

From expression 3.0, each bracket, without exponent=2, is renamed in expression 4.0. This represents the conversion of the elliptical form to the circular form of the colored sparkle difference ΔCS, having the same numerical results. As mentioned above, since the equation for CSv is based on square root, converting the elliptical form of colored sparkle difference into the circular form of colored sparkle difference with the same numerical results, after applying accordingly the corresponding colored sparkle tolerances: tangential CSv tolerance, perpendicular CSv tolerance. A visual experiment crossing instrumental differences (ΔT, ΔS) with visual data (OK or acceptable, NOK or rejected) is designed and executed under the same lighting conditions as for the colored sparkle visual scaling, but using different colored sparkle sample sets, to determine $T_\phi$, the tangential colored sparkle tolerance, and $T_{CSv}$, the perpendicular colored sparkle tolerance. For this particular application, the values of $T_\phi$, and $T_{CSv}$ in expression 3.0 can be any positive number, e.g., 2.8 for $T_\phi$, and 1.8 for $T_{CSv}$ (other values may be used, depending on the particular embodiment and application).

The circular form of ΔCS is more intuitive and practical to work with, because it enables use of a circular shaped tolerance region centered about a point that corresponds to the coating sample that is to be colored sparkle matched. In accordance with the exemplary embodiment described here, the circular shaped tolerance region has a radius of $\sqrt{2}$ (about 1.41). This value of 1.41 can be used as a threshold value when analyzing computed values of ΔCS.

Referring again to FIG. 8, the illustrated embodiment of the process 700 continues by comparing the computed value of ΔCS against a colored sparkle threshold value ($TH_2$) that is defined and maintained for the particular system (query task 714). As mentioned above. $TH_2$ may be specified to be 1.41, or it may be any suitable value within a range of about 0.5 to 2.5, such as 1.5. The colored sparkle threshold value is used to determine whether the candidate coating specimen poorly matches the coating sample that is to be colored sparkle matched. In this regard, the process 700 determines that the candidate coating specimen poorly matches the coating sample when the colored sparkle difference is greater than the colored sparkle threshold value (i.e., when ΔCS>$TH_2$). In this way, the process 700 makes a secondary determination of how well the candidate coating specimen matches the coating sample.

If ΔCS>$TH_2$ (the "Yes" branch of query task 714), then the process 700 declares that the candidate coating specimen under analysis does not match the coating sample. At this point, the process 700 may exit or proceed to check the next candidate coating specimen (task 706). FIG. 8 depicts task 706 leading back to task 702, so that the initial test based on colored sparkle visual scaling values can be repeated for the next candidate coating specimen. If ΔCS is not greater than $TH_2$ (the "No" branch of query task 714), then the process 700 continues with at least one additional test or check to determine how well the candidate coating specimen matches the close-view-texture colored sparkle characteristics of the coating sample. As an example, a typical viewing distance of sparkle is about 0.5 m. At longer distances the colored sparkle is progressively not visible, if the effect pigment particle size is small (12 microns). At this typical viewing distance (e.g., 0.5 meter), any normal human observer can recognize the presence of individual sparkle points on darker colored background, with variety of chromatic sparkle points, mainly caused by pearlescent pigment types. Aluminum pigment types are mainly responsible of achromatic sparkle appearance (or light-gray sparkle points). Pearlescent pigment types are mainly responsible of chromatic or colored sparkle appearance, where the visual recognition of reddish, bluish, greenish, etc., with less or more colorfulness or saturation, sparkle points is very clear at 0.5 meters.

A "No" decision at query task 714 indicates that the currently selected candidate coating specimen passes the secondary test for colored sparkle matching with the coating sample. The initial and secondary matching criteria associated with query tasks 704 and 714 can be used to obtain a good approximation of colored sparkle matching. Nonetheless, the illustrated embodiment of the process 700 includes at least one additional test (described below) to increase the accuracy of colored sparkle matching decisions.

In accordance with certain embodiments, the next test/check performed by the process 700 considers the colored sparkle color gamuts of the coating sample and the candidate coating specimen. For this particular example, the colored sparkle gamut of the coating sample is associated with the JMH color image data of the coating sample, and the colored sparkle gamut of the candidate coating specimen is associated with the JMH color image data of the candidate coating specimen. The pixel-based JMH color model property data 716 for the coating sample and the pixel-based JMH color model property data 718 for the candidate coating specimen are schematically depicted in FIG. 8. As described above with reference to FIG. 5, the JMH color model property data 716, 718 corresponds to the high color contrast sparkle points that have been identified for the coating sample and the candidate coating specimen that are to be color sparkle matched.

Figure 9:
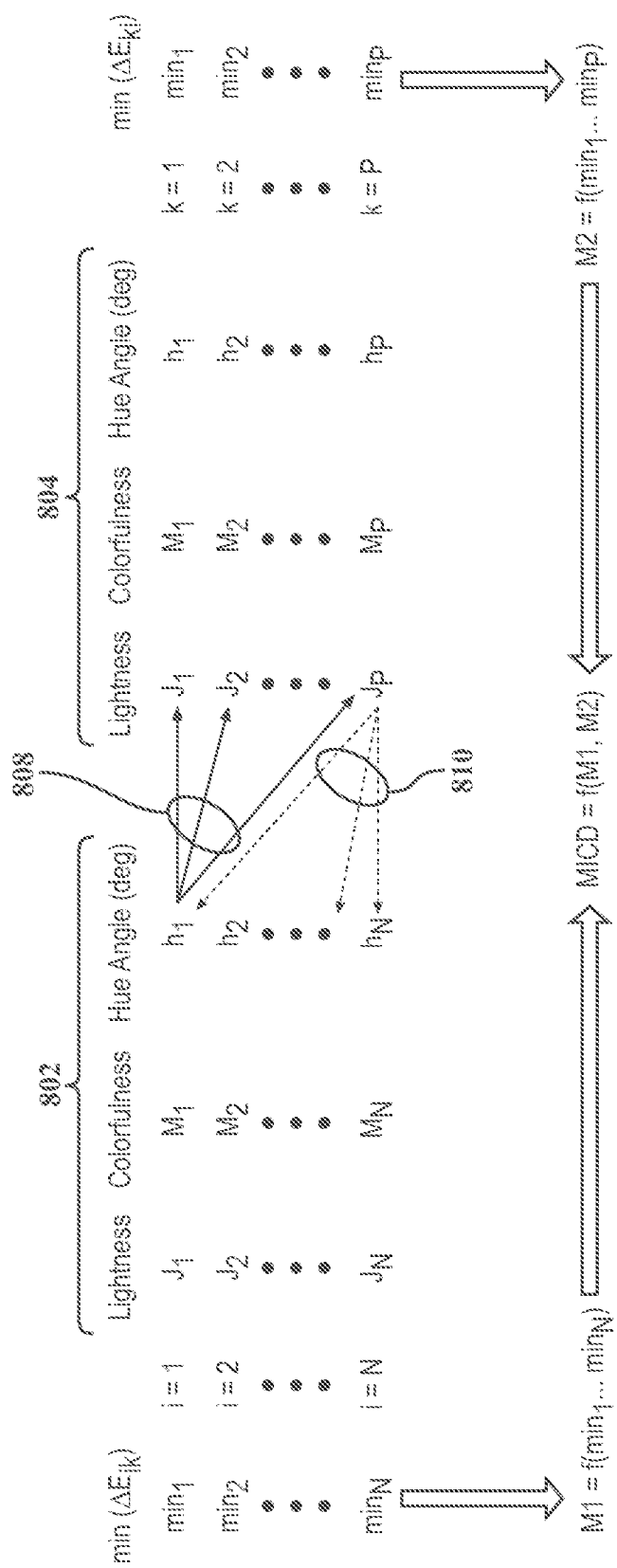
FIG. 9 is a diagram that illustrates a methodology for calculating a minimum color difference metric from pixel-based sparkle point color model properties of a coating sample and a candidate coating specimen.

The depicted embodiment of the process 700 calculates a minimum color difference metric (MICD) from the JMH color model property data 716, 718 (task 720). The MICD can be calculated based on a comparison of colored sparkle palettes associated with the high color contrast sparkle points (identified for the coating sample and the candidate coating specimen). In this regard, FIG. 9 is a diagram that illustrates a methodology for calculating the MICD from the pixel-based JMH color model properties of a coating sample and a candidate coating specimen. The left side of FIG. 9 depicts a matrix 802 that includes the JMH color model property values of the candidate coating specimen, and the right side of FIG. 9 depicts a matrix 804 that includes the JMH color model property values of the coating sample that is to be colored sparkle matched. The matrix 802 includes a number (N) of rows corresponding to N identified high color contrast sparkle points of the candidate coating specimen; each row includes three columns (for the J, M, and h values, h in degrees). Similarly, the matrix 804 includes a number (P) of rows corresponding to P identified high color contrast sparkle points of the coating sample; each row includes three columns (for the J. M, and h values, h in degrees). Although N and P are usually different numbers, they may be identical in some situations. The rows in the matrix 802 are identified by the index i (ranging from 1 to N), and the rows in the matrix 804 are identified by the index k (ranging from 1 to P).

The MICD calculation is based on many individual calculations of color difference. More specifically, each identified sparkle point of the candidate coating specimen is individually compared against each identified sparkle point of the coating sample to obtain a respective color difference value ($\Delta E_{ik}$), resulting in N color difference values. The minimum of the N color difference values is selected, identified, or recorded for the sparkle point of the candidate coating specimen. This routine is repeated for each identified sparkle point of the candidate coating specimen, resulting in N minimum color difference values recorded in association with the candidate coating specimen. A similar procedure is performed to compare each identified sparkle point of the coating sample against each identified pixel of the candidate coating specimen, resulting in P color difference values ($\Delta E_{ki}$) corresponding to the respective rows in the matrix 804. The minimum of the P color difference values is selected, identified, or recorded for the sparkle point of the coating sample. This routine is repeated for each identified sparkle point of the coating sample, resulting in P minimum color difference values recorded in association with the coating sample that is to be colored sparkle matched.

FIG. 9 illustrates the methodology that obtains the minimum color difference values. The solid arrows 808 represent the calculation of the N color difference values ($\Delta E_{ik}$) for the first sparkle point in the matrix 802 (where i=1). The minimum of those N color difference values is identified for subsequent use—this minimum value is labeled "min$_1$" on the left side of FIG. 9. An equivalent routine is performed to obtain the minimum color difference value for each sparkle point (each row of the matrix 802). The N minimum values (min$_{1-N}$) are labeled on the left side of FIG. 9. The dashed arrows 810 represent the calculation of the P color difference values ($\Delta E_{ki}$) for the last pixel in the matrix 804 (where k=P). Following the same methodology, the P minimum values (min$_{1-P}$) are labeled on the right side of FIG. 9.

In accordance with the exemplary embodiments presented here, the color difference value (when comparing a sparkle point of the candidate coating specimen against the sparkle points of the coating sample that is to be colored sparkle matched) is calculated by way of the following expressions:

$$\Delta E_{ik} = \sqrt{(J_i - J_k)^2 + (M_i - M_k)^2 + (H_i - H_k)^2} \quad (5.0)$$

$$(H_i - H_k) = 2\sqrt{M_i M_k} \sin((h_i - h_k)/2) \quad (6.0)$$

In these expressions, the values of J, M, and h (in degrees) correspond to the pixel-specific JMH color model properties that appear in the matrices 802, 804. The expression 6.0 represents a conversion of the original hue angle data into corresponding visually correlated hue data, which in turn can be used to calculate the color difference value. Similarly, the color difference value (when comparing a sparkle point of the coating sample against the sparkle points of the candidate coating specimen) is calculated using the following expressions:

$$\Delta E_{ki} = \sqrt{(J_k - J_i)^2 + (M_k - M_i)^2 + (H_k - H_i)^2} \quad (7.0)$$

$$(H_k - H_i) = 2\sqrt{M_k M_i} \sin((h_k - h_i)/2) \quad (8.0)$$

Referring again to FIG. 9, a first value (labeled M1) is obtained as a function of the minimum values of $\Delta E_{ik}$ (i.e., min$_1$ to min$_N$), and a second value (labeled M2) is obtained as a function of the minimum values of $\Delta E_{ki}$ (i.e., min$_1$ to min$_P$). In accordance with certain embodiments, M1 is defined as the mean of the minimum values min$_1$ to min$_N$, and M2 is defined as the mean of the minimum values min$_1$ to min$_P$. Accordingly, M1 provides a good approximation of overall color difference when the colored sparkle points of the candidate coating specimen are compared against the colored sparkle points of the coating sample that is to be matched, while M2 provides a good approximation of overall color difference when the colored sparkle points of the coating sample are compared against the colored sparkle points of the candidate coating specimen. For the exemplary implementation presented here, the MICD is obtained as a function of M1 and M2. More specifically, the MICD is defined as the mean of M1 and M2. Thus, the MICD value represents a good characterization of the colored sparkle difference between the candidate coating specimen and the coating sample that is to be color sparkle matched. In theory, an MICD value of zero indicates a perfect colored sparkle gamut match, and higher values of MICD indicate respectively higher colored sparkle gamut mismatches.

Returning to FIG. 8, the process 700 calculates the MICD at task 720 and compares the MICD against a color difference threshold value (TH$_3$) that is defined and maintained for the particular system (query task 722). The color difference threshold value may be specified to be about 1.5 or about 2.0, or it may be any suitable value within a range of about 1.0 to 3.0. The color difference threshold value is used to determine how well the candidate coating specimen matches the coating sample (in terms of colored sparkle gamut characteristics). In this regard, the process 700 determines that the candidate coating specimen poorly matches the coating sample when the MICD is greater than the color difference threshold value (i.e., when MICD>TH$_3$). In this way, the process 700 makes a final determination of how well the candidate coating specimen matches the coating sample.

If the MICD>TH$_3$ (the "Yes" branch of query task 722), then the process 700 declares that the candidate coating specimen under analysis does not match the coating sample. At this point, the process 700 may exit or proceed to check the next candidate coating specimen (task 706). FIG. 8 depicts task 706 leading back to task 702, so that the initial test based on colored sparkle visual scaling values can be repeated for the next candidate coating specimen. If the MICD is not greater than TH$_3$ (the "No" branch of query task 722), then the process 700 determines or declares that the candidate coating specimen matches, in colored sparkle, the coating sample that is to be colored sparkle matched (task 724), both in spatial pattern (macro-texture) and colored sparkle gamut (close-view-texture). In this regard, a "No" decision at query task 722 indicates that the currently selected candidate coating specimen has passed the initial, secondary, and final tests for colored sparkle matching against the coating sample.

If all of the matching criteria is satisfied (the "No" branch of query task 722, which indicates that the candidate coating specimen closely matches the coating sample, in colored sparkle characteristics), then the process 700 may identify the candidate coating specimen as a good colored sparkle match (task 724) and retrieve, access, or otherwise obtain relevant information or data related to that candidate coating specimen. For example, the process 700 may obtain certain colorimetric properties of the candidate coating specimen (task 726). This information may already be stored in the coating specimen database 108 (see FIG. 2), or it could be provided upon request or on demand as needed. As another example, the process 700 may retrieve a production formulation or "recipe" associated with the candidate coating specimen (task 728) and provide the retrieved information as an output for consideration by a user, a technician, or an operator of a coating application system. Production formulations may already be stored in the coating specimen database 108, or they could be provided upon request or on demand as needed. In certain embodiments, the retrieved information (e.g., a production formulation) can be provided to a mixing or fabrication system or station that mixes a coating according to the retrieved formulation.

Although not separately depicted in FIG. 8, the process 700 may return to task 706 after identifying a matching coating specimen. Indeed, the comparison routine of the process 700 can be repeated any number of times until a desired number of candidate coating specimens are identified as being potential matches. A user can then be presented with different options, sample images of the candidate coating specimens, and/or other information that enables the user to make an informed decision regarding which (if any) candidate coating specimen to consider.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A computer-implemented method of evaluating and matching colored sparkle appearance of coatings containing at least one effect pigment type, the method comprising:
   receiving a digital image of a coating sample to be colored sparkle matched, the digital image captured by a digital image capture system, and the digital image represented by captured color image data formatted in accordance with a first color model that is native to the digital image capture system;
   converting the captured color image data into pixel-specific sparkle point data and pixel-specific background data, wherein the pixel-specific sparkle point data and the pixel-specific background data are both formatted in accordance with an advanced color appearance model that corresponds to human color perception;
   calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched;
   retrieving a second colored sparkle visual scaling value for a candidate coating specimen, wherein the second colored sparkle visual scaling value indicates colored sparkle characteristics of the candidate coating specimen;
   comparing the first colored sparkle visual scaling value against the second colored sparkle visual scaling value; and
   determining how well the candidate coating specimen matches the coating sample to be colored sparkle matched, based on results of the comparing step.

2. The method of claim 1, wherein the converting step further comprises:
   transforming the captured color image data into relative color image data formatted in accordance with a relative tristimulus color model.

3. The method of claim 2, wherein the converting step further comprises:
   applying at least one scene photometry parameter to the relative color image data to obtain scene-adjusted color image data formatted in accordance with an absolute tristimulus color model.

4. The method of claim 3, wherein the at least one scene photometry parameter comprises a light intensity value or an illuminance level associated with an observation environment for the coating sample to be matched.

5. The method of claim 3, wherein the at least one scene photometry parameter comprises a lamp type associated with an observation environment for the coating sample to be matched.

6. The method of claim 3, wherein the converting step further comprises:
   processing the scene-adjusted color image data to distinguish constituent sparkle point pixel data and constituent background pixel data, wherein the constituent sparkle point pixel data and the constituent background pixel data are both formatted in accordance with the absolute tristimulus color model.

7. The method of claim 6, wherein the converting step further comprises:
   transforming the constituent sparkle point pixel data into the pixel-specific sparkle point data, which is formatted in accordance with the advanced color appearance model; and
   transforming the constituent background pixel data into the pixel-specific background data, which is formatted in accordance with the advanced color appearance model.

8. The method of claim 1, wherein:
   the calculating step further comprises performing a segmentation routine on the pixel-specific sparkle point data and the pixel-specific background data to identify sparkle pixels that exhibit visually distinguishable sparkle effects that satisfy a color difference threshold in accordance with the advanced color appearance model; and
   the first colored sparkle visual scaling value is calculated from colored sparkle characteristics of the identified sparkle pixels.

9. The method of claim 1, wherein:
   the calculating step further comprises determining, from the pixel-specific sparkle point data and the pixel-specific background data, a sparkle strength value for the coating sample to be color sparkle matched, wherein the sparkle strength value is indicative of high color contrast;
   the calculating step further comprises determining, from the pixel-specific sparkle point data and the pixel-specific background data, a sparkle texture value for the coating sample to be color sparkle matched, wherein the sparkle texture value is indicative of physical density of sparkle points; and
   the first colored sparkle visual scaling value is calculated from the sparkle strength value and the sparkle texture value.

10. The method of claim 9, wherein:
    the calculating step further comprises calculating a visual texture value from the sparkle texture value; and
    the first colored sparkle visual scaling value is calculated from the sparkle strength value and the visual texture value.

11. The method of claim 1, further comprising:
    calculating a visual scaling difference between the first colored sparkle visual scaling value and the second colored sparkle visual scaling value;

comparing the visual scaling difference against a visual scaling threshold value; and determining that the candidate coating specimen poorly matches the coating sample to be colored sparkle matched, when the visual scaling difference is greater than the visual scaling threshold value.

12. The method of claim 11, further comprising:

computing a colored sparkle difference between the candidate coating specimen and the coating sample to be colored sparkle matched, when the visual scaling difference is not greater than the visual scaling threshold value;

comparing the colored sparkle difference against a colored sparkle threshold value; and determining that the candidate coating specimen poorly matches the coating sample to be colored sparkle matched, when the colored sparkle difference is greater than the colored sparkle threshold value.

13. The method of claim 12, further comprising:

determining, from the pixel-specific sparkle point data and the pixel-specific background data, a sparkle strength value for the coating sample to be colored sparkle matched, wherein the sparkle strength value is indicative of high color contrast;

determining, from the pixel-specific sparkle point data and the pixel-specific background data, a visual texture value for the coating sample to be colored sparkle matched, wherein the visual texture value is indicative of visual density of sparkle points;

computing a sparkle strength difference between a sparkle strength value for the candidate coating specimen and the sparkle strength value for the coating sample to be colored sparkle matched; and computing a visual texture difference between a visual texture value for the candidate coating specimen and the visual texture value for the coating sample to be colored sparkle matched;

wherein the colored sparkle difference, or spatial pattern difference, is computed as a function of the sparkle strength difference and the visual texture difference.

14. The method of claim 12, further comprising:

calculating a minimum color difference metric, based on pixel-based color model properties of high color contrast sparkle points identified for the candidate coating specimen and for the coating sample to be colored sparkle matched, when the colored sparkle difference is not greater than the colored sparkle threshold value;

comparing the minimum color difference metric against a color difference threshold value;

determining that the candidate coating specimen poorly matches the coating sample to be colored sparkle matched, when the minimum color difference metric is greater than the color difference threshold value; and determining that the candidate coating specimen matches, in colored sparkle, the coating sample to be colored sparkle matched, when the minimum color difference metric is not greater than the color difference threshold value.

15. The method of claim 14, further comprising:

retrieving a production formulation associated with the candidate coating specimen, in response to determining that the candidate coating specimen matches the coating sample to be color sparkle matched.

16. The method of claim 14, wherein the minimum color difference metric is calculated based on a comparison of colored sparkle palettes associated with the high color contrast sparkle points.

17. A computing system operable to evaluate and match color and appearance of coatings containing at least one effect pigment type, the computing system comprising:

at least one processor; and at least one non-transitory machine-readable storage medium that stores instructions executable by the at least one processor, the instructions configurable to cause the at least one processor to perform a method comprising the steps of:

receiving a digital image of a coating sample to be colored sparkle matched, the digital image captured by a digital image capture system, and the digital image represented by captured color image data formatted in accordance with a first color model that is native to the digital image capture system;

converting the captured color image data into pixel-specific sparkle point data and pixel-specific background data, wherein the pixel-specific sparkle point data and the pixel-specific background data are both formatted in accordance with an advanced color appearance model that corresponds to human color perception;

calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched;

retrieving a second colored sparkle visual scaling value for a candidate coating specimen, wherein the second colored sparkle visual scaling value indicates colored sparkle characteristics of the candidate coating specimen;

comparing the first colored sparkle visual scaling value against the second colored sparkle visual scaling value; and determining how well the candidate coating specimen matches the coating sample to be colored sparkle matched, based on results of the comparing step.

18. The computing system of claim 17, wherein the converting step further comprises:

transforming the captured color image data into relative color image data formatted in accordance with a relative tristimulus color model;

applying at least one scene photometry parameter to the relative color image data to obtain scene-adjusted color image data formatted in accordance with an absolute tristimulus color model;

processing the scene-adjusted color image data to distinguish constituent sparkle point pixel data and constituent background pixel data, wherein the constituent sparkle point pixel data and the constituent background pixel data are both formatted in accordance with the absolute tristimulus color model;

transforming the constituent sparkle point pixel data into the pixel-specific sparkle point data, which is formatted in accordance with the advanced color appearance model; and transforming the constituent background pixel data into the pixel-specific background data, which is formatted in accordance with the advanced color appearance model.

19. The computing system of claim 17, wherein:

the calculating step further comprises determining, from the pixel-specific sparkle point data and the pixel-specific background data, a sparkle strength value for the coating sample to be colored sparkle matched, wherein the sparkle strength value is indicative of high color contrast;

the calculating step further comprises determining, from the pixel-specific sparkle point data and the pixel-specific background data, a visual texture value for the coating sample to be colored sparkle matched; and the first colored sparkle visual scaling value is calculated from the sparkle strength value and the visual texture value.

20. The computing system of claim 17, wherein the method performed by the at least one processor further comprises:

calculating a visual scaling value difference between the first colored sparkle visual scaling value and the second colored sparkle visual scaling value;

comparing the visual scaling value difference against a visual scaling threshold value; and determining that the candidate coating specimen poorly matches the coating sample to be colored sparkle matched, when the visual scaling value difference is greater than the visual scaling threshold value.

21. The computing system of claim 20, wherein the method performed by the at least one processor further comprises:

computing a colored sparkle difference between the candidate coating specimen and the coating sample to be colored sparkle matched, when the visual scaling value difference is not greater than the visual scaling threshold value;

comparing the colored sparkle difference against a colored sparkle threshold value; and determining that the candidate coating specimen poorly matches the coating sample to be colored sparkle matched, when the colored sparkle difference is greater than the colored sparkle threshold value.

22. The computing system of claim 21, wherein the method performed by the at least one processor further comprises:

calculating a minimum color difference metric, based on pixel-based color model properties of high color contrast sparkle points identified for the candidate coating specimen and for the coating sample to be colored sparkle matched, when the colored sparkle difference is not greater than the colored sparkle threshold value;

comparing the minimum color difference metric against a color difference threshold value;

determining that the candidate coating specimen poorly matches the coating sample to be colored sparkle matched, when the minimum color difference metric is greater than the color difference threshold value; and determining that the candidate coating specimen matches, in colored sparkle, the coating sample to be colored sparkle matched, when the minimum color difference metric is not greater than the color difference threshold value.

23. The computing system of claim 22, wherein the method performed by the at least one processor further comprises:

retrieving a production formulation associated with the candidate coating specimen, in response to determining that the candidate coating specimen matches the coating sample to be color sparkle matched.

24. At least one non-transitory machine-readable storage medium that stores instructions executable by at least one processor, the instructions configurable to cause the at least one processor to perform a method of evaluating and matching colored sparkle appearance of coatings containing at least one effect pigment type, the method comprising:

receiving a digital image of a coating sample to be colored sparkle matched, the digital image captured by a digital image capture system, and the digital image represented by captured color image data formatted in accordance with a first color model that is native to the digital image capture system;

converting the captured color image data into pixel-specific sparkle point data and pixel-specific background data, wherein the pixel-specific sparkle point data and the pixel-specific background data are both formatted in accordance with an advanced color appearance model that corresponds to human color perception;

calculating, from the pixel-specific sparkle point data and the pixel-specific background data, a first colored sparkle visual scaling value for the coating sample to be colored sparkle matched, wherein the first colored sparkle visual scaling value indicates colored sparkle characteristics of the coating sample to be colored sparkle matched;

retrieving a second colored sparkle visual scaling value for a candidate coating specimen, wherein the second colored sparkle visual scaling value indicates colored sparkle characteristics of the candidate coating specimen;

comparing the first colored sparkle visual scaling value against the second colored sparkle visual scaling value; and determining how well the candidate coating specimen matches the coating sample to be colored sparkle matched, based on results of the comparing step.

* * * * *